US008117360B2

United States Patent
Iwagami et al.

(10) Patent No.: US 8,117,360 B2
(45) Date of Patent: *Feb. 14, 2012

(54) ON-VEHICLE ELECTRONIC CONTROL DEVICE

(75) Inventors: Yuki Iwagami, Tokyo (JP); Tetsushi Watanabe, Tokyo (JP); Junya Tanaka, Tokyo (JP); Manabu Yamashita, Tokyo (JP); Koji Hashimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1378 days.

This patent is subject to a terminal disclaimer.

(21) Appl. No.: 11/714,741

(22) Filed: Mar. 7, 2007

(65) Prior Publication Data

US 2008/0071949 A1 Mar. 20, 2008

(30) Foreign Application Priority Data

Sep. 15, 2006 (JP) ................... 2006-250832

(51) Int. Cl.
 G06F 3/00 (2006.01)
 G06F 5/00 (2006.01)
(52) U.S. Cl. ................ 710/59; 701/1; 701/36
(58) Field of Classification Search ............... 710/1, 59; 701/1, 36
 See application file for complete search history.

(56) References Cited

U.S. PATENT DOCUMENTS

| 5,737,246 | A | 4/1998 | Furukawa et al. |
| 7,467,036 | B2 * | 12/2008 | Iwagami et al. ............. 701/36 |
| 2003/0187569 | A1 | 10/2003 | Iwagami et al. |
| 2006/0089756 | A1 | 4/2006 | Iwagami et al. |

FOREIGN PATENT DOCUMENTS

| JP | 8-23276 A | 1/1996 |
| JP | 08-068873 A | 3/1996 |
| JP | 08-328744 A | 12/1996 |
| JP | 2002-209886 A | 7/2002 |
| JP | 2005-164500 A | 6/2005 |
| JP | 2006-123607 A | 5/2006 |

* cited by examiner

*Primary Examiner* — Tariq Hafiz
*Assistant Examiner* — Aurangzeb Hassan
(74) *Attorney, Agent, or Firm* — Sughrue Mion, PLLC

(57) ABSTRACT

An on-vehicle electronic control device 100A serially transmits A/D conversion data of plural channels from a second control circuit unit 300A including a multichannel A/D converter 204A to a microprocessor 110A disposed in a first control circuit unit 200A. The A/D conversion data are organized into a communication packet and transmitted via first and second buffer memories 204b and 204d, and when there is an abnormality in the A/D conversion data, transfer between the first and second buffer memories 204b and 204d is prohibited and an abnormality report is performed with respect to the microprocessor 110A. As a result, erroneous data are not transmitted, and communication congestion and the burden of the microprocessor 110A are alleviated.

11 Claims, 9 Drawing Sheets

ON-VEHICLE ELECTRONIC CONTROL DEVICE

BACKGROUND

1. Technical Field

The present invention relates to an on-vehicle electronic control device such as an engine control device configured such that electrically divided first and second control circuit units serially exchange monitor and control signals with each other, and more particularly to the improvement of an on-vehicle electronic control device for efficiently and accurately transmitting digitally converted analog signals.

2. Related Art

An on-vehicle control device is publicly known which is configured such that electrically divided first and second control circuit units serially exchange monitor and control signals by a periodic transmission packet that is a downlink communication, a periodic report packet that is an uplink communication, and a report reply packet that is an uplink communication corresponding to a read request packet that is a downlink communication.

For example, Japanese Patent Application Publication (JP-A) No. 2003-285702 (see paragraph nos. 0020 to 0114 and FIG. 2) discloses an on-vehicle electronic control device comprising: a microprocessor to which a parent station serial/parallel converter is connected to configure a first control circuit unit; and a communication control circuit unit to which a child station serial/parallel converter serially connected to the parent station serial/parallel converter is connected to configure a second control circuit unit, wherein the communication control circuit unit includes first storing means that stores data transmitted from the parent station to the child station, distribution storing means which, when command data stored in the first storing means is a write/set command, transfers the command data to a device memory, reply packet generating means that generates uplink reply information with respect to the microprocessor, second storing means that sequentially stores the reply information and reads the reply information on a first-in first-out basis while waiting out congestion, and reply packet organizing means that adds and sends back latest information.

The reply packet is a packet with which the on-vehicle electronic control device can periodically send back ON/OFF information of 16 points or less and periodically send back digital conversion values of analog signals of 15 points or less.

Furthermore, JP-A No. 8-23276 (see paragraph nos. 0012 to 0026 and FIG. 1) discloses an analog/digital conversion device comprising: (1) a multiplexer unit that selects, in accordance with a selection command, one channel from among plural channels to which analog signals are inputted; (2) an analog/digital conversion unit that converts, to a digital signal, the one analog signal selected by the multiplexer unit; and (3) a control unit that outputs the selection command to the multiplexer unit and reads the digital signal converted by the analog/digital conversion unit, wherein (4) the multiplexer unit includes a channel return unit which, when the analog/digital conversion unit completes conversion, returns the selected channel to the control unit, and (5) the control unit includes an abnormality judging unit that judges as abnormal when the channel outputted to the multiplexer unit and the channel returned from the channel return unit do not match.

JP-A No. 8-23276 also discloses an analog/digital conversion device comprising: (6) a multiplexer unit that selects, in accordance with a selection command, one channel from among plural channels to which analog signals are inputted; (7) an analog/digital conversion unit that converts, to a digital signal, the one analog signal selected by the multiplexer unit; and (8) a control unit that outputs the selection command to the multiplexer unit and reads the digital signal converted by the analog/digital conversion unit, wherein (9) the control unit includes an abnormality judging unit that measures the amount of time required for the analog/digital conversion unit to complete conversion after the control unit has outputted a conversion start command to the analog/digital conversion unit and judges as abnormal when the amount of time required for conversion is equal to or greater than a predetermined longest time.

Moreover, JP-A No. 2002-209886 (see paragraph nos. 0009 to 0024 and FIG. 1) discloses an ultrasound diagnostic device including: (1) an ultrasound probe including a piezoelectric vibrator that receives an ultrasound echo corresponding to an ultrasound pulse transmitted inside a test subject and generates a received echo signal; (2) A/D converting means that converts the received echo signal to parallel data at a timing matching a sampling period; (3) time division outputting means that divides into plural bit strings the parallel data outputted at the same time from the A/D converting means and time-divisionally switches and outputs each bit string in a period shorter than the sampling period; (4) and signal processing means that restores the original parallel data on the basis of the bit strings outputted by the time division outputting means, wherein the time division outputting means includes (5) a latch circuit that temporarily retains and outputs the parallel data at a timing matching the sampling period and (6) a selector circuit that plurally divides and retrieves the bit strings outputted by the latch circuit and switches and outputs each bit string in a period shorter than the sampling period.

The on-vehicle electronic control device of JP-A No. 2003-285702 is configured such that it can alternately periodically report ON/OFF information that is switch signal input and digital information that is the digital conversion value of the analog input signal, but there is no reference to abnormality judging and abnormality processing of the analog conversion data.

Further, the analog/digital conversion device of JP-A No. 8-23276 has the drawback that, when attempting to obtain digital information of analog signals, it becomes necessary to transmit before hand a channel designation command each time, so the burden of communication control becomes excessive when attempting to obtain a lot of digital information frequently.

Moreover, the analog/digital conversion device of JP-A No. 8-23276 also has the drawback that abnormality judgment is slow and needless transmission must be performed because it is configured to perform abnormality judgment of the A/D converter after it has transmitted A/D-converted digital information.

Moreover, the ultrasound diagnostic device of JP-A No. 2002-209886 is configured to divide A/D conversion data into a high-order bit group and a low-order bit group, transmit the groups, and combine the groups at the reception side, but when the timing of data division is asynchronous with the A/D conversion timing, there is the risk that data division abnormality will occur, so that when the groups are combined at the reception side, the high-order bit group of old data and the low-order bit group of new data become combined as one data group, for example.

SUMMARY

The present invention has been made in order to address these problems, and it is a first object thereof to obtain an on-vehicle electronic control device configured to efficiently and frequently transmit digital conversion values of many analog signals such that accurate A/D conversion information is obtained while reducing the control burden.

It is a second object of the present invention to obtain an on-vehicle electronic control device configured to accurately transmit, using communicating means of a typical word length, digital conversion data of a long bit resulting from a multichannel A/D converter including high-accuracy resolution.

An on-vehicle electronic control device pertaining to the present invention is configured such that a first control circuit unit including a program memory that includes input/output control means and communication control means, a RAM memory for arithmetic processing, a microprocessor that cooperates with the program memory, and a first serial/parallel converter and a second control circuit unit including a communication control circuit unit for exchanging at least monitor and control signals with the first control circuit unit, an indirect switch signal input circuit, an indirect analog signal input circuit including a multichannel A/D converter, a data memory, and a second serial/parallel converter serially exchange monitor and control signals with each other via the first and second serial/parallel converters.

The first control circuit unit further includes periodic transmitting means, and the second control circuit unit further includes periodic reporting means, conversion abnormality determining means, abnormality reporting means, data update commanding means, and first and second buffer memories.

The periodic transmitting means is means that transmits, by a periodic transmission packet, constant setting data and control output data periodically from the first control circuit unit to the second control circuit unit and writes and sets, so as to store in the data memory, the constant setting data and the control output data in the second control circuit unit.

The periodic reporting means are means that report and send back, by a periodic report packet, monitor input data and status information from the second control circuit unit to the first control circuit unit such that the first control circuit unit stores the periodic report data in the RAM memory.

The conversion abnormality determining means are means that determine that the multichannel A/D converter is abnormal by detecting that the A/D conversion value resulting from the multichannel A/D converter is outside the range of predetermined upper and lower limits or that the amount of time required for A/D conversion is equal to or greater than a predetermined value.

The abnormality reporting means is means that acts when abnormality determination of the multichannel A/D converter has been done by the conversion abnormality determining means and periodically reports to the first control circuit unit by writing status information in a data memory of a predetermined address and adding this status information to the periodic report packet.

The data update commanding means is means that acts between the first and second buffer memories and allows data transfer from the first buffer memory to the second buffer memory when determination by the conversion abnormality determining means is normal.

The first buffer memory is a data memory in which are primarily stored A/D conversion data of all channels resulting from the multichannel A/D converter.

The second buffer memory is a data memory to which are collectively transferred the contents of the first buffer memory at a point in time before the multichannel A/D converter completes A/D conversion of all channels and starts next A/D conversion and when the data update commanding means is allowing data updating. The periodic report packet is organized on the basis of the contents of the second buffer memory.

As described above, the present invention provides an on-vehicle electronic control device that serially transmits A/D conversion data of plural channels from a second control circuit unit including a multichannel A/D converter to a first control circuit unit including a microprocessor. The A/D conversion data are organized into a communication packet and transmitted via first and second buffer memories, and when there is an abnormality in the A/D conversion data, transfer between the first and second buffer memories is prohibited and an abnormality report is performed with respect to the first control circuit unit.

Consequently, there are the effects that, because normal data are collectively transmitted to the second buffer memory for report transmission after the multichannel A/D converter completes the series of A/D conversions and the normal data are prepared, erroneous data can be prevented from being transmitted and creating confusion, and communication congestion resulting from needles report communication can be avoided.

Further, old data stored in the second buffer memory can be reported and transmitted while another A/D conversion is being performed after the occurrence of an abnormality, it is possible to wait for A/D conversion to be returned to normal by another A/D conversion command, and abnormality status is periodically reported, so that when abnormality continues, abnormality processing can be performed by the first control circuit unit.

The foregoing and other objects, features, aspects, and advantages of the present invention will become more apparent from the following detailed description of the present invention when taken in conjunction with the accompanying drawings.

BRIEF DESCRIPTION OF THE DRAWINGS

Exemplary embodiments of the present invention will be described in detail based on the following figures, wherein.

DETAILED DESCRIPTION

First Exemplary Embodiment (1) Detailed Description of Configuration of First Exemplary Embodiment A first exemplary embodiment of this invention will be described below.

Figure 1:
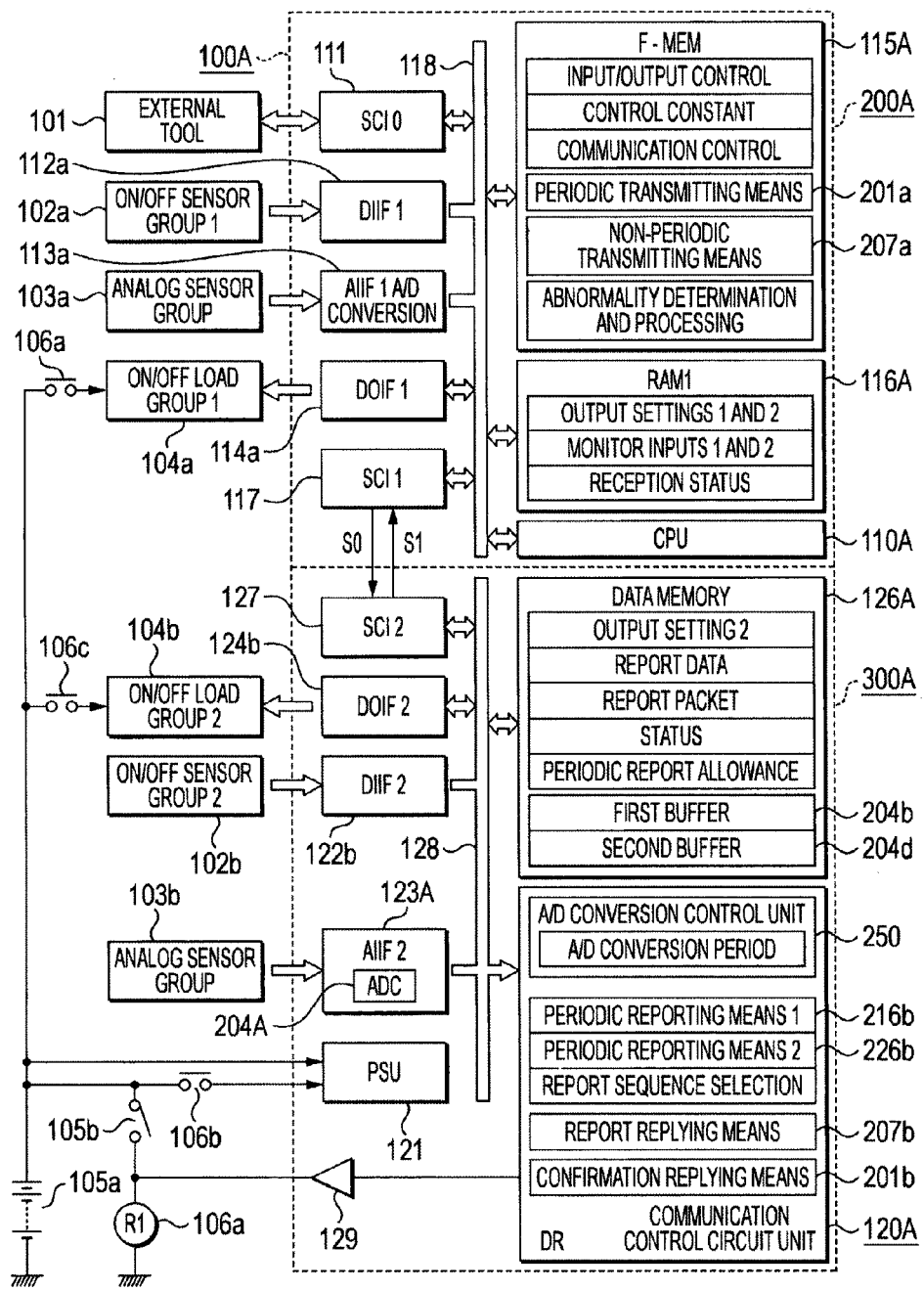
FIG. 1 is a total block diagram showing an on-vehicle electronic control device according to a first exemplary embodiment of this invention.

FIG. 1 is a total block diagram showing an on-vehicle electronic control device 100A according to a first embodiment of this invention.

In FIG. 1, the on-vehicle electronic control device 100A is configured by a first control circuit unit 200A and a second control circuit unit 300A.

Turning first to that which is connected to the outside of the on-vehicle electronic control device 100A, an external tool 101 is connected via an unillustrated detachable connector to the on-vehicle electronic control device 100A at the time of product shipment or at the time of maintenance. The external tool 101 is for transferring and writing control programs and control constants to a later-described nonvolatile program memory 115A.

A first input sensor group 102a is a sensor group that ON/OFF operates at a relatively high speed and relatively frequently and for which direct importing is necessary with respect to a later-described microprocessor 110A.

A second input sensor group 102b is a sensor group that performs ON/OFF operation relatively infrequently and for which delay of signal importation does not become much of a problem.

A first analog sensor group 103a is a sensor group whose relative degree of change is intense and for which direct importing is necessary with respect to the later-described microprocessor 110A.

A second analog sensor group 103b is a sensor group that performs relatively slow output change and for which delay of signal importation does not become much of a problem.

A first electric load group 104a is an electric load group of ON/OFF operation that performs operation relatively frequently and for which it is necessary to generate drive output without delay.

A second electric load group 104b is an electric load group of ON/OFF operation that performs operation relatively infrequently and for which response delay of drive output does not become much of a problem.

An on-vehicle battery 105a is an external power supply that powers the on-vehicle electronic control device 100A and the first and second electric load groups 104a and 104b. A power switch 105b is configured to drive a power supply relay 106a, close a power supply circuit with respect to the first and second electric load groups 104a and 104b by output contacts 106b and 106c of the power supply relay 106a, and close a feeder circuit with respect to the on-vehicle electronic control device 100A by an output contact 106d.

It will noted that, as for the on-vehicle battery 105a and the on-vehicle electronic control device 100A, a minute power feeder circuit is configured which is for backing up a RAM memory even when the power switch 105b is open.

Turning next to the configuration of the first control circuit unit 200A, the microprocessor 110A has 32-bit processing capability, for example, is chiefly responsible for input/output control in the on-vehicle electronic control device 100A, and is configured to intercommunicate with the external tool 101 via a serial interface 111 at the time of shipment adjustment or maintenance.

A direct switch signal input circuit 112a is a direct input signal-use interface circuit connected in parallel to the first input sensor group 102a. A multichannel A/D converter 113a is a direct analog signal input circuit connected to the first analog sensor group 103a. A direct output circuit 114a is a direct output signal-use interface circuit resulting from a power transistor and the like connected in parallel to the first electric load group 104a. A program memory 115A is a nonvolatile memory such as a flash memory. A RAM memory 116A is a volatile memory for arithmetic processing. A first serial/parallel converter 117 is a serial communication circuit that forms a pair with a later-described second serial/parallel converter 127 and serves as a parent station with respect to the second serial/parallel converter 127.

It will be noted that the serial interface 111, the first serial/parallel converter 117, the direct switch signal input circuit 112a, the multichannel A/D converter 113a, the direct output circuit 114a, the program memory 115A, the RAM memory 116A, and the microprocessor 110A are interconnected by a data bus 118, and that which has been designated by an unillustrated address bus or chip selector circuit intercommunicates with the microprocessor 110A.

Figure 2:
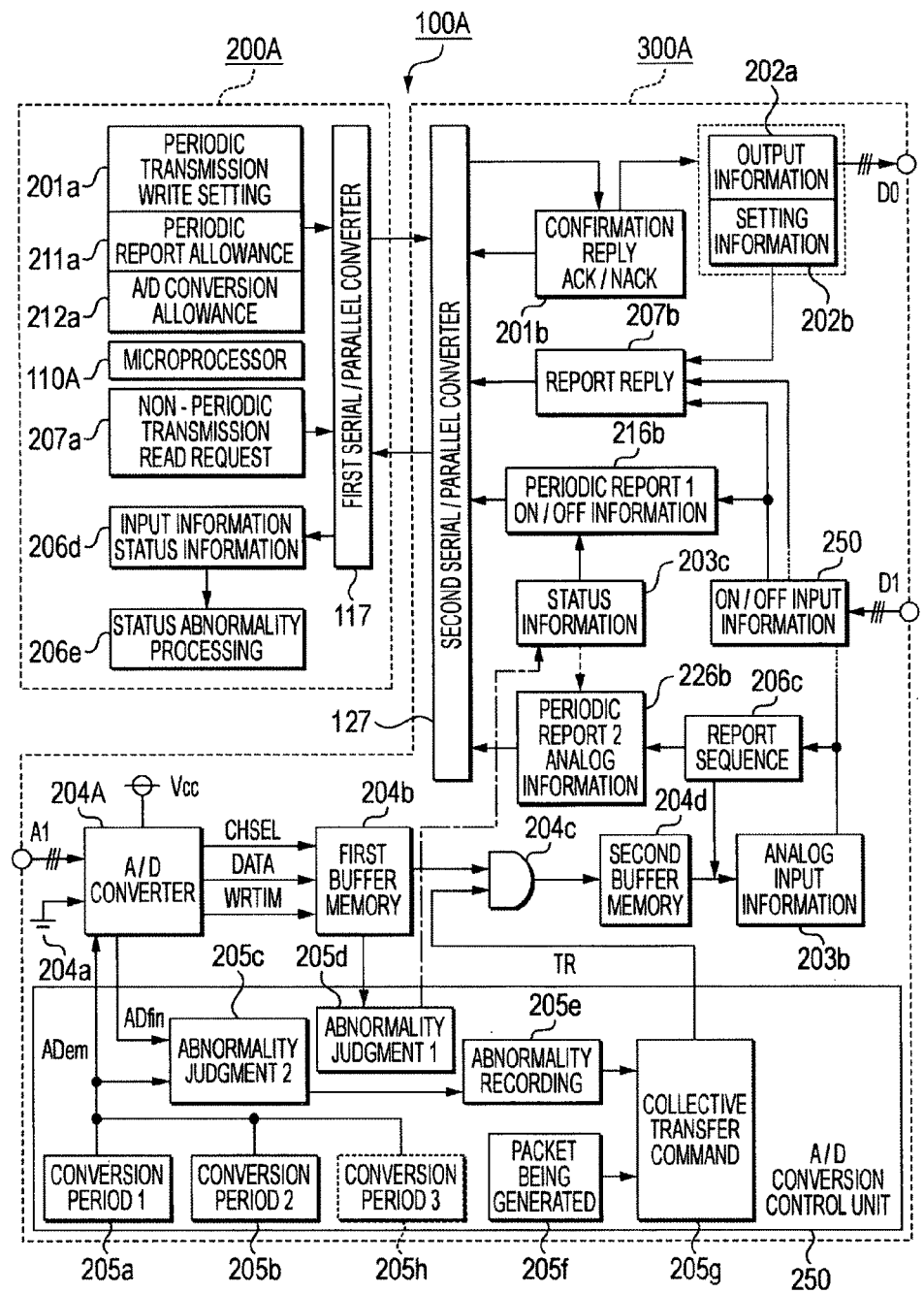
FIG. 2 is a functional block diagram describing communication control by the on-vehicle electronic control device according to the first exemplary embodiment of this invention.

Further, a program serving as input/output control means and a program serving as communication control means, or a program serving as various control means associated with the first control circuit unit 200A shown in the control block diagram of FIG. 2, are written in the program memory 115A.

Moreover, output setting data with respect to the first and second electric load groups 104a and 104b or input signals from the first input sensor group 102a and the first analog sensor group 103a and monitor input data such as indirect input information and status information reported from the later-described second control circuit unit 300A are written in the RAM memory 116A.

Turning now to the configuration of the second control circuit unit 300A, a communication control circuit unit 120A is a logic circuit that includes a later-described A/D conversion control unit 250 and performs communication control with respect to the first control circuit unit 200A while cooperating with a data memory 126A.

An indirect switch signal input circuit 122b is an indirect input signal-use interface circuit connected in parallel to the second input sensor group 102b. A multichannel A/D converter 204A configures an analog signal input circuit 123A connected to the second analog sensor group 103b. An indirect output circuit 124b is an indirect output signal-use interface circuit resulting from a power transistor and the like connected in parallel to the second electric load group 104b. A second serial/parallel converter 127, is a serial communication circuit serving as a child station. It will be noted that the first and second serial/parallel converters 117 and 127 are serially interconnected and configured to exchange control signals transmitted from the parent station to the child station and monitor signals reported from the child station to the parent station.

Further, the second serial/parallel converter 127, the indirect switch signal input circuit 122b, the indirect output circuit 124b, the multichannel A/D converter 204A, the data memory 126A, and the communication control circuit unit 120A are interconnected by a data bus 128.

Moreover, various setting data transmitted from the microprocessor 110A and output setting data with respect to the second electric load group 104b or monitor input signals from the second input sensor group 102b and the second analog sensor group 103b for reporting to the microprocessor 110A and status information relating to the second control circuit unit 300A are written in the data memory 126A.

A power supply unit 121 is directly powered by the on-vehicle battery 105a, is powered via the output contact 106d of the power supply relay 106a, and is configured to generate stabilized control power supply output used inside the on-vehicle electronic control device 100A.

The communication control circuit unit 120A is configured to generate power relay drive output DR by a command from the microprocessor 110A and perform self-holding drive with respect to the power supply relay 106a via a drive element 129.

In the on-vehicle electronic control device 100A configured as described above, as input signals for input/output control, there are the first input sensor group 102a and the first analog sensor group 103a directly bus-connected to the microprocessor 110A and the second input sensor group 102b and the second analog sensor group 103b indirectly connected via the first and second serial/parallel converters 117 and 127 to the microprocessor 110A.

The microprocessor 110A generates control output signals on the basis of the status of these monitor input signals and the control programs and control constants stored in the program memory 115A.

The first electric load 104a directly bus-connected to the microprocessor 110A and the second electric load 104b indirectly connected via the first and second serial/parallel converters 117 and 127 to the microprocessor 110A are configured to be driven by the control output signals.

It will be noted that the control programs and control constants are transferred to and stored in the program memory 115A in advance from the external tool 101 before the on-vehicle electronic control device 100A starts running, and when the on-vehicle electronic control device 100A starts running, some of the control constants stored inside the program memory 115A are transferred to the data memory 126A.

Further, 201a, 201b, 204b, 204d, 207a, 207b, 216b, and 226b in FIG. 1 will be described in the description of FIG. 2.

FIG. 2, which is a functional block diagram describing communication control by the on-vehicle electronic control device of FIG. 1, will be described below.

FIG. 2 is a functional block diagram describing communication control by the on-vehicle electronic control device according to the first exemplary embodiment of this invention.

In FIG. 2, signals exchanged between the first control circuit unit 200A (called "parent station" below) including the first serial/parallel converter 117 and the second control circuit unit 300A (called "child station" below) including the second serial/parallel converter 127 are roughly classified as follows.

Periodic transmitting means 201a is means for transmitting a later-described periodic transmission packet 201aa that is prepared by the parent station and transmitted from the parent station to the child station. The periodic transmission packet 201aa is voluntarily substantially periodically transmitted from the parent station even if there is no request from the child station, and is managed such that the upper limit of the time interval thereof becomes equal to or less than a predetermined value.

Confirmation replying means 201b is means with which the child station that has received the periodic transmission packet 201aa sends back normal reception or reception abnormality by a confirmation reply packet 201bb. In the data normally received by the periodic transmission packet 201aa, there are output information outputted to the second electric load group 104b of FIG. 1 via the data memory 126A and various setting constants written in the data memory 126A. The packet configurations will be described in detail in FIG. 3.

An output information storage block 202a and a setting information storage block 202b are blocks that write, in a predetermined address of the data memory 126A, the output and setting information transmitted from the parent station by the periodic transmission packet 201aa. The write address at this time is designated in the periodic transmission packet 201aa.

An ON/OFF input information reading block 203a is a reading block for collectively reading, in 16-point units for example, ON/OFF information of the second input sensor group 102b that had been stored in the data memory 126A from the indirect switch signal input circuit 122b, organizing the ON/OFF information in a later-described first report packet 216bb, and reporting the ON/OFF information to the first control circuit unit 200A by first periodic reporting means 216b.

An analog input information reading block 203b is a reading block for organizing, by a later-described second report packet 226bb, A/D conversion data stored in a second buffer memory 204d that is a second region of the data memory 126A and reporting the A/D conversion data to the first control circuit unit 200A by second periodic reporting means 226b.

It will be noted that the multichannel A/D converter 204A included in the indirect analog input interface circuit 123A is a 10-bit resolution 8-channel A/D converter, for example, and is powered by a control voltage Vcc generated by the power supply unit 121. The same control voltage Vcc is applied to a reference power supply terminal of the multichannel AD converter 204A.

When an A/D conversion start command ADen is applied to the multichannel A/D converter 204A on the basis of A/D conversion period designating means 205a and 205b or periodic A/D conversion commanding means 205h described later in FIG. 4, the multichannel A/D converter 204A sequentially performs A/D conversion with respect to analog inputs of channels 0 to 7, for example, generates a channel selection signal "chsel", A/D conversion data "data", and a write timing signal "wrtim", and temporarily stores the A/D conversion data of all channels in a first buffer memory 204b that is a first region of the data memory 126A, and when it is determined that there is no abnormality after A/D conversion of all channels is completed, the A/D conversion data are collectively transferred to the second buffer memory 204d. The analog input information reading block 203b is configured to collectively read, in units of 2 channels for example, the contents of the second buffer memory 204d and report the contents to the first control circuit unit 200A by the second report packet 226bb.

The A/D conversion control unit 250 is configured by A/D conversion period designating means 205a and 205b that supply the A/D conversion start command ADen to the multichannel A/D converter 204A, conversion abnormality determining means 205c and 205d, abnormality reporting means 205e, data update commanding means 205g, and packet generation monitoring means 205f.

The conversion abnormality determining means 205c is time excess determining means that measures the amount of time required for the multichannel A/D converter 204A to generate an A/D conversion finish signal ADfin for all channels after the A/D conversion start command ADen has been supplied to the multichannel A/D converter 204A and determines that the multichannel A/D converter 204A is abnormal when this amount of required time exceeds a predetermined value.

The conversion abnormality determining means 205d is conversion constant abnormality determining means that determines as abnormal when a digital conversion value with respect to a constant sample voltage 204a inputted to a specific channel of the multichannel A/D converter 204A is outside the range of predetermined allowable error.

It will be noted that two types of sample voltages may also be used as the sample voltages 204a in order to check whether or not the conversion abnormality determining means 205d is performing abnormality judgment correctly when intentionally switching between and connecting a voltage other than a predetermined voltage.

The abnormality reporting means 205e is configured to record the fact that abnormality judgment of the multichannel A/D converter 204A has been done by the conversion abnormality determining means 205c and 205d and periodically report to the first control circuit unit 200A by writing status information 203c with respect to the data memory 126A of a predetermined address, and adding this status information 203c to the first report packet 216bb (or to the second report packet 226bb).

It will be noted that, when A/D conversion abnormality is a temporary thing resulting from noise malfunction, for example, and no abnormality occurs in the next A/D conversion cycle, then the abnormality record of the abnormality reporting means 205e is reset and the status information 203c also changes to normal information.

The data update commanding means 205g is means that acts between the first and second buffer memories 204b and 204d and allows data transfer from the first buffer memory 204b to the second buffer memory 204d when determination by the conversion abnormality determining means 205c and 205d is normal.

The packet generation monitoring means 205f is for prohibiting data updating by the data update commanding means 205g during the generation period from the start of generation to the completion of generation of the second report packet 226bb.

Consequently, as long as determination by the conversion abnormality determining means 205c and 205d is normal and the second report packet 226bb is not in the process of being generated, the A/D conversion values of the multiple channels that had been stored in the first buffer memory 204b are collectively transferred to the second buffer memory 204d via a gate circuit 204c, and the contents of the second buffer memory 204d are read by the analog input information reading block 203b and reported as the second report packet 226bb.

Report sequence selecting means 206c is selection control means that sequentially selects between the first report packet 216bb that collectively reports plural ON/OFF information inputted from the indirect switch signal input circuit 122b and the plural second report packets 226bb that report digital information of a predetermined number of channels digitally converted by the multichannel A/D converter 204A, and prioritizes the first report packet 216bb in a relationship where at least the second report packets 226bb are not continuous to perform periodic reporting by first and second periodic reporting means 216b and 226b.

It will be noted that the first and second report packets 216bb and 226bb are voluntarily substantially periodically alternately transmitted from the child station even if there is no request from the parent station, and are managed such that the upper limit of the time interval thereof becomes equal to or less than a predetermined value.

A report information storage block 206d is means that transfers and writes, to a predetermined address of the RAM memory 116A, the monitor information reported by the first and second periodic reporting means 216b and 226b.

The RAM memory 116A is configured such that 16-bit data can be stored therein, and two A/D conversion data (10 bits each) organized by the second report packets 226bb are respectively distributed to and stored in the RAM memory 116A of two determined addresses.

Status abnormality processing means 206e acts when the status information included in the first or second report packet 216bb or 226bb includes abnormality information of the multichannel A/D converter 204A resulting from the conversion abnormality determining means 205c and 205d, counts the number of times that the abnormality information is received, performs abnormality processing when the number of times that the abnormality information is received exceeds a predetermined number of times, and resets the multichannel A/D converter 204A and the first and second buffer memories 204b and 204d or resets the entire second control circuit unit 300A.

Non-periodic transmitting means 207a is means that transmits a non-periodic transmission packet 207aa from the parent station to the child station when the parent station performs a read request with respect to the child station. Report replying means 207b is means that sends back a report reply packet 207bb from the child station to the parent station, and the address of the data memory 126A serving as the target of report reply is designated within the non-periodic transmission packet 207aa.

Aperiodic transmission packet 211aa serving as periodic report allowing means 211a and a periodic transmission packet 212aa serving as A/D conversion allowing means 212a are both one type of the periodic transmission packet 201aa, and the contents thereof will be described in detail in FIG. 3.

Figure 3:
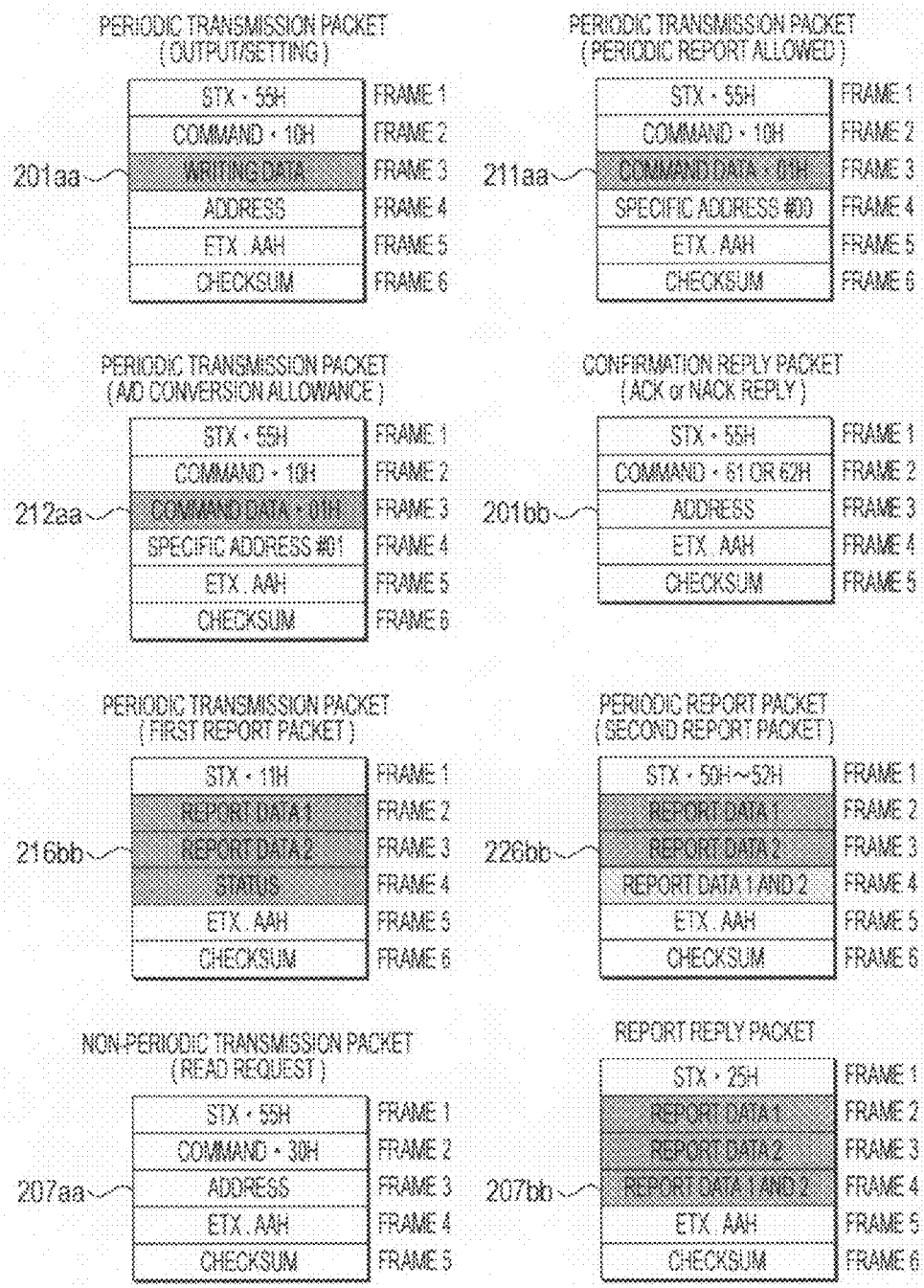
FIG. 3 is a diagram showing communication packets in the on-vehicle electronic control device according to the first exemplary embodiment of this invention.

FIG. 3, which is a diagram showing the configuration of communication packets in the on-vehicle electronic control device of FIG. 1, will be described below.

FIG. 3 is a diagram showing communication packets in the on-vehicle electronic control device according to the first exemplary embodiment of this invention.

In FIG. 3, the periodic transmission packet 201aa serving as the periodic transmitting means 201a from the parent station to the child station is configured by frame 1 to frame 6 which are start data 55H, a periodic transmission command 10H, write data, a storage location address, end data AAH, and checksum data.

It will be noted that the aforementioned "H" represents that each numerical value is expressed as a hexadecimal, and the checksum data shown in frame 6 of the periodic transmission packet 201aa is the complement of the binarily added values of data of frame 1 to frame 5.

The periodic transmission packet 211aa serving as the periodic report allowing means 211a is one type of periodic transmission packet in which information to allow periodic reporting is included as command data. The periodic transmission packet 211aa is configured by the six frames of start data 55H, a periodic transmission command 10H, command data 01H, a specific address #00, end data AAH, and checksum data. The periodic transmission packet 211aa allows periodic reporting by the command data 01H and prohibits periodic reporting by setting the command data to 00H.

Further, the storage location of the command data is address #00 of the data memory 126A.

The periodic transmission packet 212aa serving as the A/D conversion allowing means 212a is one type of periodic transmission packet in which information to allow A/D conversion is included as command data. The periodic transmission packet 212aa is configured by the six frames of start data 55H, a periodic transmission command 10H, command data 01H, a specific address #01, end data AAH, and checksum data.

When this A/D conversion allowance command has been written in address #01 of the data memory 126a, then the periodic transmission packet 212aa continuously allows A/D conversion by the command data 01H and prohibits A/D conversion by setting the command data to 00H.

The confirmation reply packet 201bb serving as the confirmation replying means 201b is configured by the five frames of start data 55H, an ACK command 61H or a NACK command 62H, an address, end data AAH, and checksum data.

When the periodic transmission packet 201aa has been normally received, then the command data becomes 61H, and when the received data is abnormal, then the command data becomes 62H, and the address data is the same address as the address that had been designated within the periodic transmission packet 201aa.

The first report packet 216bb is a communication packet serving as the first periodic reporting means 216b that reports ON/OFF input information with respect to the parent station. The first report packet 216bb is configured by the six frames of start data 11H, report data 1, report data 2, status information, end data AAH, and checksum data.

ON/OFF information for 16 points is collectively reported by the report data 1 and the report data 2.

The second report packet 226bb is a communication packet serving as the second periodic reporting means 226b that reports analog input information with respect to the parent station. The second report packet 226bb is configured by the six frames of start data 50H to 53H, report data 1, report data 2, report data 1/2, end data AAH, and checksum data.

When the start data is 50H, then the digital conversion values of analog input channels 0 and 1 are reported. When the start data is 51H, then the digital conversion values of analog input channels 2 and 3 are reported. When the start data is 52H, then the digital conversion values of analog input channels 4 and 5 are reported. And when the start data is 53H, then the digital conversion values of analog input channels 6 and 7 are reported.

The two analog signals to be reported are converted to digital values of 10 bits each. One digital conversion value is reported by 10 bits which is the sum of 8 bits of frame 2 and the low-order 2 bits of frame 4, and the other digital conversion value is reported by 10 bits which is the sum of 8 bits of frame 3 and the high-order 2 bits of frame 4.

It will be noted that each 2 bits of frame 4 may be concentrated in 0 to 3 bits at the low-order side to report the status information by high-order 4 bits.

The non-periodic transmission packet 207aa is a communication packet serving as the non-periodic transmitting means 207a for read-requesting the data of the address that the parent station designated with respect to the child station. The non-periodic transmission packet 207aa is configured by the five frames of start data 55H, a read request command 30H, an address, end data AAH, and checksum data.

The report reply packet 207bb is a communication packet serving as the report replying means 207b with respect to the data of the address read-requested from the parent station. The report reply packet 207bb is configured by the six frames of start data 25H, report data 1, report data 2, status or report data 1/2, end data AAH, and checksum data.

It will be noted that as long as the address designated by the non-periodic transmission packet 207aa is 11H or 50H to 53H, for example, then the contents of frame 2 to frame 4 in the report reply packet 207bb become the same as the contents in the first and second report packets 216bb and 226bb.

In the above description, with respect to the first and second report packets 216bb and 226bb and in the report reply packet 207bb, address frames are omitted in order to reduce the number of frames and identification is done by the start data STX line, but when the number of ON/OFF input signals serving as report targets or the number of analog input signals is large, then address frames can be added and changed to a simple frame configuration.

Figure 4:
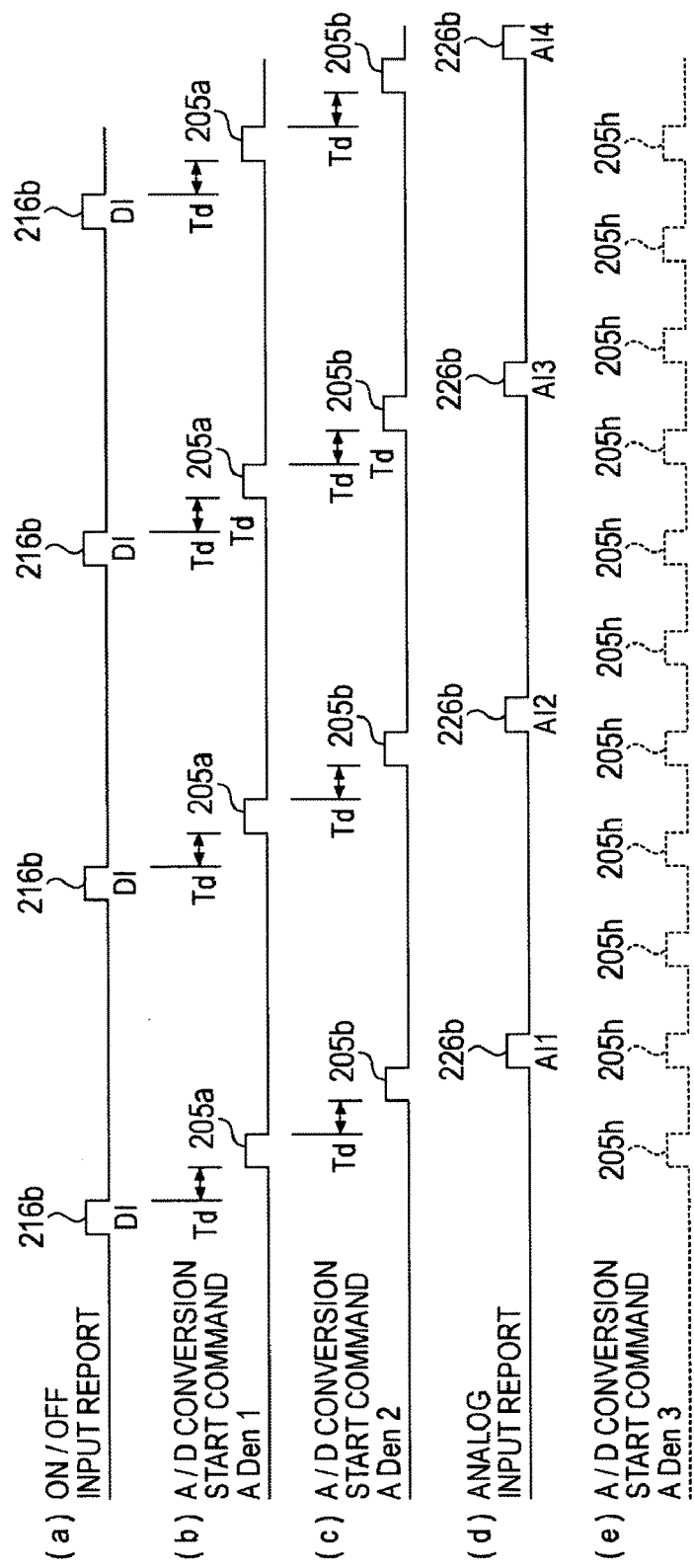
FIG. 4 is a time chart showing periodic reporting in the on-vehicle electronic control device according to the first exemplary embodiment of this invention.

FIG. 4, which is a time chart showing periodic reporting in the on-vehicle electronic control device of FIG. 1, will be described below.

FIG. 4 is a time chart showing periodic reporting in the on-vehicle electronic control device according to the first exemplary embodiment of this invention.

FIG. 4(*a*) shows the timing when ON/OFF input information is transmitted to the microprocessor 110A by the first periodic reporting means 216b, and the average interval thereof is about 20 msec.

FIG. 4(*b*) shows the timing when an A/D conversion start command ADen1 is supplied to the multichannel A/D converter 204A by the A/D conversion period designating means 205a, and this supply timing is the point in time when Td=3 msec is disposed as delay time after the first report packet 216bb has been transmitted by the first periodic reporting means 216b.

FIG. 4(*c*) shows the timing when an A/D conversion start command ADen2 is supplied to the multichannel A/D converter 204A by the A/D conversion period designating means 205b, and this supply timing is the point in time when Td=3 msec is disposed as delay time after the A/D conversion start command ADen1 has been supplied.

FIG. 4(*d*) shows the timing when analog input information is transmitted to the microprocessor 110A by the second periodic reporting means 226b, and this timing is at an intermediate position of the transmission timing of the first report packet 216bb, so that the first and second report packets 216bb and 226bb are alternately transmitted at periods of about 10 msec overall.

However, with respect to the contents of the second report packet 226bb, the analog input channel serving as the target of transmission sequentially changes, so eight A/D conversion data of all channels become transmitted by transmitting the second report packet 226bb four times.

The amount of time required for the multichannel A/D converter 204A to complete A/D conversion of all channels is a short amount of time less than 1 msec, and is time-allocated in a relationship such that two A/D conversions by the A/D conversion start commands ADen1 and ADen2 are completed before the transmission timing of the second report packet 226bb.

Consequently, when A/D conversion by the A/D conversion start command ADen2 is normal and no abnormality has been generated by the conversion abnormality determining means 205c and 205d, then the latest A/D conversion data A/D-converted on the basis of the A/D conversion start command ADen2 are transferred to the second buffer memory 204d from the first buffer memory 204b, and the second report packet 226bb is organized on the basis of this latest A/D conversion data.

However, the input channel whose A/D conversion data are to be used is sequentially switched and selected by the report sequence selecting means 206c.

On the other hand, when A/D conversion by the A/D conversion start command ADen2 is abnormal, then the A/D conversion data based on the A/D conversion start command ADen2 are not transferred to the second buffer memory 204d, the A/D conversion data stored in the second buffer memory 204d becomes the old A/D conversion data that has been A/D-converted by the previous A/D conversion start command ADen1, and the second report packet 226bb is organized on the basis of this old A/D conversion data.

However, because the analog signals inputted to the multichannel A/D converter 204A show slow change and the reporting period is short in comparison to the rate of variability of the signals, no problems in terms of utilization occur as long as the A/D conversion abnormality is something resulting from temporary noise malfunction or the like.

However, when permanent abnormality of the multichannel A/D converter 204A itself occurs, then microprocessor 110A executes abnormality processing by the status abnormality processing means 206e.

It will be noted that periodic reporting can also be performed by the status information with respect also to breakage and short circuit abnormalities of the analog input signal circuit by adding abnormality determining means that determines that the analog input signal circuit is abnormal when the analog signal becomes a value less than 0.5 V or a value that exceeds 4.5 V because the analog signal of each channel ordinarily varies between 0.5 V and 4.5 V.

Even in such cases, normal data prior to the occurrence of a breakage or short circuit abnormality remains in the second buffer memory 204d and can be utilized as reference information of abnormality countermeasure processing.

FIG. 4(e) shows a time chart of an A/D conversion start command ADen3 resulting from the third A/D conversion commanding means 205h instead of the A/D conversion start commands ADen1 and ADen2. The A/D conversion start command ADen3 is generated at constant periods of 4 msec, for example, without relation to the transmission timings of the first and second report packets 216bb and 226bb.

When using such an asynchronous A/D conversion format, updating is prohibited by the packet generation monitoring means 205f such that data updating and transfer from the first buffer memory 204b to the second buffer memory 204d is not performed even accidentally during organization of the second report packet 226bb.

It will be noted that it is necessary to execute A/D conversion before hand by the A/D conversion start command ADen3 when a read request by the non-periodic transmitting means 207a is performed at a point in time when periodic reporting is not being allowed by the periodic report allowing means 211a and that read request target is A/D conversion data.

(2) Detailed Description of Action and Operation

In the on-vehicle electronic control device configured as described above, when the power switch 105b is closed, the power supply unit 121 powered by the on-vehicle battery 105a generates the predetermined control voltage Vcc such that each part of the first and second control circuit units 200A and 300A are powered, and the microprocessor 110A and the communication control circuit unit 120A begin operation.

The microprocessor 110A performs drive control of the first and second electric load groups 104a and 104b on the basis of the ON/OFF input signals obtained from the first and second input sensor groups 102a and 102b, the analog signal voltage levels obtained form the first and second analog sensor groups 103a and 103b, and the input/output control program stored in the nonvolatile program memory 115A.

It will be noted that, whereas the first input sensor group 102a, the first analog sensor group 103a, and the first electric load group 104a are connected in parallel via the interface circuit to the microprocessor 110A, the second input sensor group 102b, the second analog sensor group 103b, and the second electric load group 104b are serially connected via the pair of serial/parallel converters 117 and 127 to reduce the number of input/output terminals of the microprocessor 110A.

The ON/OFF input information resulting from the second input sensor group 102b is periodically reported by the first report packet 216bb, the A/D conversion information resulting from the second analog sensor group 103b is periodically reported by the second report packet 226bb, and control signals are supplied by the periodic transmission packet 201aa with respect to the second electric load group 104b.

When periodic reporting is being allowed, the first and second report packets 216bb and 226bb are alternately transmitted, and as for the content of the second report packet 226bb, the target channel is sequentially changed by the report sequence selecting means 206c.

However, immediately after operation starts, some of the control constants stored in the program memory 115 are transmitted to the data memory 126A by the periodic transmission packet 201aa, and thereafter the first and second periodic reporting means 216b and 226b are started by the periodic report allowing means 211a.

Further, regardless of whether or not periodic reporting is allowed, the microprocessor 110A performs a read request by the non-periodic transmitting means 207a and can obtain information of a specific address by the report replying means 207b.

When periodic reporting is being allowed, A/D conversion data of all channels of the multichannel A/D converter 204A are stored with respect to the second buffer memory 204d before the A/D conversion period designating means 205a and 205b generate the A/D conversion start commands ADen1 and ADen2 of plural times synchronous with the transmission of the first report packet 216bb and organize the second report packet 226bb.

However, when the conversion abnormality determining means 205c and 205d perform abnormality judgment, data updating with respect to the second buffer memory 204d is prohibited, the status information 203c is periodically reported, and abnormality processing by the microprocessor 110A is executed by the status abnormality processing means 206e.

When periodic reporting is not being allowed, the A/D conversion start command ADen3 is periodically generated by the periodic A/D conversion commanding means 205h and report reply of the A/D conversion data is performed by the report reply packet 207bb when a read request by the non-periodic transmitting means 207a occurs.

In a case resulting from the A/D conversion start command ADen3, updating is prohibiting by the packet generation monitoring means 205f such that data updating and transfer from the first buffer memory 204b to the second buffer memory 204d is not performed even accidentally during organization of the second report packet 226bb.

Of the configural elements of the first control circuit unit 200A, the microprocessor 110A, the program memory 115A, the RAM memory 116A, the serial interface 111, the input circuit-use data selector, the multichannel A/D converter, the output circuit-use latch memory, and the first serial/parallel converter 117 are integrated as a first integrated circuit element, and just large parts such as heat parts, condensers, and power transistors are disposed outside the integrated circuit element.

Further, of the configural elements of the second control circuit unit 300A, the communication control circuit unit 120A, the data memory 126A, the input circuit-use data selector, the multichannel A/D converter, the output circuit-use latch memory, the first serial/parallel converter 127, and the constant voltage control circuit unit in the power supply unit 121 are integrated as a second integrated circuit element, and just large parts such as heat parts, condensers, and power transistors are disposed outside the integrated circuit element.

In this first exemplary embodiment, the communication control circuit unit 120A is configured by a logic circuit that does not have a microprocessor, but it is also possible to use a second microprocessor instead of this logic circuit.

It will be noted that, in regard to the action and operation of FIG. 2, which is a functional block diagram for describing communication control by the on-vehicle electronic control device of FIG. 1, operation that is substantially the same as the flow charts of FIG. 6 to FIG. 9 is performed, and detailed description will be given later while making clear these differences.

(3) Summary and Characteristics of Configuration

As is apparent from the above description, the on-vehicle electronic control device according to the first exemplary embodiment of this invention is an on-vehicle electronic control device 100A configured such that a first control circuit unit 200A including a program memory 115A that includes input/output control means and communication control means, a RAM memory 116A for arithmetic processing, a microprocessor 110A that cooperates with the program memory 115A, and a first serial/parallel converter 117 and a second control circuit unit 300A including a communication control circuit unit 120A for exchanging at least monitor and control signals, an indirect switch signal input circuit 122b, an indirect analog signal input circuit 123A including a multichannel A/D converter 204A, a data memory 126A, and a second serial/parallel converter 127 serially exchange monitor and control signals with each other via the first and second serial/parallel converters 117 and 127, wherein the first control circuit unit 200A further includes periodic transmitting means 201a, and the second control circuit unit 300A further includes periodic reporting means 216b and 226b, conversion abnormality determining means 205c and 205d, abnormality reporting means 205e, data update commanding means 205g, and first and second buffer memories 204b and 204d.

The periodic transmitting means 201a is means that transmits, by a periodic transmission packet 201aa, constant setting data and control output data periodically from the first control circuit unit 200A to the second control circuit unit 300A and writes and sets, so as to store in the data memory 126A, the constant setting data and the control output data in the second control circuit unit 300A.

The periodic reporting means 216b and 226b are means that report and send back, by aperiodic report packet 216bb (226bb), monitor input data and status information from the second control circuit unit 300A to the first control circuit unit 200A such that the first control circuit unit 200A stores the periodic report data in the RAM memory 116A.

The conversion abnormality determining means 205c and 205d are means that determine that the multichannel A/D converter 204A is abnormal by detecting that the A/D conversion value resulting from the multichannel A/D converter 204A is outside the range of predetermined upper and lower limits or that the amount of time required for A/D conversion is equal to or greater than a predetermined value.

The abnormality reporting means 205e is means that acts when abnormality determination of the multichannel A/D converter 204A has been done by the conversion abnormality determining means 205c and 205d and periodically reports to the first control circuit unit 200A by writing status information in the data memory 126A of a predetermined address and adding this status information to the periodic report packet 216bb (226bb).

The data update commanding means 205g is means that acts between the first and second buffer memories 204b and 204d and allows data transfer from the first buffer memory 204b to the second buffer memory 204d when determination by the conversion abnormality determining means 205c and 205d is normal.

The first buffer memory 204b is a data memory in which are primarily stored A/D conversion data of all channels resulting from the multichannel A/D converter 204A.

The second buffer memory 204d is a data memory to which are collectively transferred the contents of the first buffer memory 204b at a point in time before the multichannel A/D converter 204A completes A/D conversion of all channels and starts next A/D conversion and when the data update commanding means 205g is allowing data updating, and the periodic report packet 226bb is organized on the basis of the contents of the second buffer memory 204d.

The second control circuit unit 300A further includes report sequence selecting means 206c.

The report sequence selecting means 206c is selection control means that sequentially selects between first periodic reporting means 216b that reports, by a first report packet 216bb, plural ON/OFF information inputted from the indirect switch signal input circuit 122b and second periodic reporting means 226b that reports, by plural second report packets 226bb, digital information of a predetermined number of channels digitally converted by the multichannel A/D converter 204A, and prioritizes the first report packet 216bb in a relationship where at least the second report packets 226bb are not continuous to perform periodic reporting, and the status information is written and organized in the first report packet 216bb or in both of the first and second report packets 216bb and 226bb and is periodically reported.

Consequently, signal changes are slow, frequent reporting is not required, and with respect to analog signal input whose data amount is large, the burden of communication control can be alleviated by distributing and reporting over time and prioritizing transmission of the first report packet.

The conversion abnormality determining means includes conversion constant abnormality determining means 205d.

The conversion constant abnormality determining means 205d is means that determines as abnormal when a constant sample voltage 204a is applied as one analog input signal inputted to the multichannel A/D converter 204A and a digital conversion value with respect to this sample voltage 204a is outside the range of predetermined allowable error.

An output voltage of a power supply unit 121 that is powered by an on-vehicle battery 105a and generates a predetermined control-use stabilized voltage is applied to a reference voltage terminal of the multichannel A/D converter 204A.

Consequently, abnormality determination including the A/D conversion precision of the multichannel A/D converter and the precision of the stabilized control voltage can be performed.

The conversion abnormality determining means includes time excess determining means 205c.

The time excess determining means 205c is means that measures the amount of time required for the multichannel A/D converter 204A to generate an A/D conversion finish signal of all channels after an A/D conversion start command has been supplied to the multichannel A/D converter 204A and determines that the multichannel A/D converter 204A is abnormal when this required amount time exceeds a predetermined value.

Consequently, abnormality in the conversion operation of the multichannel A/D converter extending to all channels can be detected by simple timekeeping means instead of detecting abnormality in A/D conversion of a specific channel.

The program memory 115A disposed in the first control circuit unit 200A further includes a control program serving as status abnormality processing means 206e.

The status abnormality processing means 206e acts when the status information included in the first or second report packet 216bb or 226bb includes abnormality information of the multichannel A/D converter 204A resulting from the conversion abnormality determining means 205c and 205d and counts the number of times that the abnormality information is received, with abnormality processing being performed when the number of times that the abnormality information is received exceeds a predetermined number of times, and the abnormality processing is at least one of processing that resets the multichannel A/D converter 204A and the first and second buffer memories 204b and 204d and processing that resets the entire second control circuit unit 300A.

Consequently, abnormality processing is executed by the first control circuit unit serving as the target of total control, without oversensitive abnormality processing being performed by the second control circuit unit, so that total control can be maintained.

The second report packet 226bb is configured by plural frames of a bit length shorter than the bit length of the A/D conversion data resulting from the multichannel A/D converter 204A, and the A/D conversion data are frame-divided into high-order bits and low-order bits and organized.

The first buffer memory 204b is a data memory of a long bit length including a number of bits equal to or less than 1.5 times the frame length of the second report packet and in which the A/D conversion data of all channels resulting from the multichannel A/D converter 204A are primarily stored.

The second buffer memory 204d is a data memory of a long bit length to which all data stored in the first buffer memory 204b are transferred by the data update commanding means 205g at a point in time before the multichannel A/D converter 204A completes A/D conversion of all channels and starts next A/D conversion and at a timing excluding the organization timing of the second report packet 226bb.

A pair of A/D conversion data among the A/D conversion data of all channels stored in the second buffer memory 204d are respectively divided into high-order and low-order bits and organized and stored in 3 frames in the second report packet 226bb.

Consequently, highly precise A/D conversion data can be efficiently transmitted.

The second control circuit unit 300A further includes periodic A/D conversion commanding means 205h.

The periodic A/D conversion commanding means 205h is means that supplies an A/D conversion command with respect to the multichannel A/D converter 204A periodically at time intervals shorter than the shortest period of the periodic reporting.

Consequently, even when a state occurs where the A/D conversion timing accidentally coincides with the generation timing of the second report packet such that transfer to the second buffer memory cannot be performed, a state does not occur where, in the next A/D conversion timing, the A/D conversion timing does not coincide with the generation timing of the second report packet, and transfer to the second buffer memory can be performed and a situation where transfer stops repeatedly continue can be avoided.

The first control circuit unit 200A further includes periodic report allowing means 211a, and the second control circuit unit 300A further includes A/D conversion period designating means 205a and 205b.

The periodic report allowing means 211a is write setting means that is transmitted by the periodic transmitting means 201a with respect to the data memory 126A of a predetermined address disposed in the second control circuit unit 300A and stores command data for allowing the second control circuit unit 300A to transmit the periodic report.

The A/D conversion period designating means 205a and 205b are conversion control means that designate an A/D conversion start period in a relationship where the series of A/D conversion operations by the multichannel A/D converter 204A are completed until a period in which the second control circuit unit 300A generates an A/D conversion start command of plural times with respect to the multichannel A/D converter 204A and transmits the next second report packet 226bb immediately after the second control circuit unit 300A has transmitted the first report packet 216bb or after a predetermined amount of time after transmitting the first report packet 216bb after receiving the periodic report allowance command by periodic report allowing means 211a.

Consequently, A/D conversion is executed immediately before transmission of the second report packet including the digital conversion values of the analog signals as transmission data, so that the latest A/D conversion data can be reported.

Further, when there is an abnormality in the latest A/D conversion data and the contents of the second buffer memory have not been updated, the A/D conversion data can be reported using the nearest past A/D conversion data.

The first control circuit unit 200A further includes non-periodic transmitting means 207a and A/D conversion allowing means 212a, and the second control circuit unit 300A further includes report replying means 207b.

The non-periodic transmitting means 207a is read requesting means that is summarized as needed in order for the first control circuit unit 200A to read and confirm monitor input data of a designated address with respect to the second control circuit unit 300A and to read and check write save data that have been written and set by the periodic transmitting means 201a.

The report replying means 207b is means that performs report reply by a report reply packet 207bb that has organized the monitor input data of the designated address or the write save data as a confirmation reply with respect to the fact that the second control circuit unit 300A has received the non-periodic transmission data.

The A/D conversion allowing means 212a is write setting means that is transmitted by the periodic transmission packet 212aa to the data memory of a predetermined address disposed in the second control circuit unit 300A and stores command data for allowing the second control circuit unit 300A to generate an A/D conversion start command with respect to the multichannel A/D converter 204A, so that A/D conversion by the multichannel A/D converter 204A is periodically executed even in a state where periodic reporting is not being allowed by the periodic report allowing means 211a and report reply of the A/D conversion data corresponding to the non-periodic transmitting means 207a can be performed.

Consequently, when periodic reporting is not to be performed, relatively new A/D conversion data are easily obtained by read request as needed by performing A/D conversion at predetermined time intervals.

Second Exemplary Embodiment (1) Detailed Description of Second Exemplary Embodiment FIG. 5, which shows a total block diagram of a second exemplary embodiment of this invention, will be described with attention given to differences with the on-vehicle electronic control device of FIG. 1.

Figure 5:
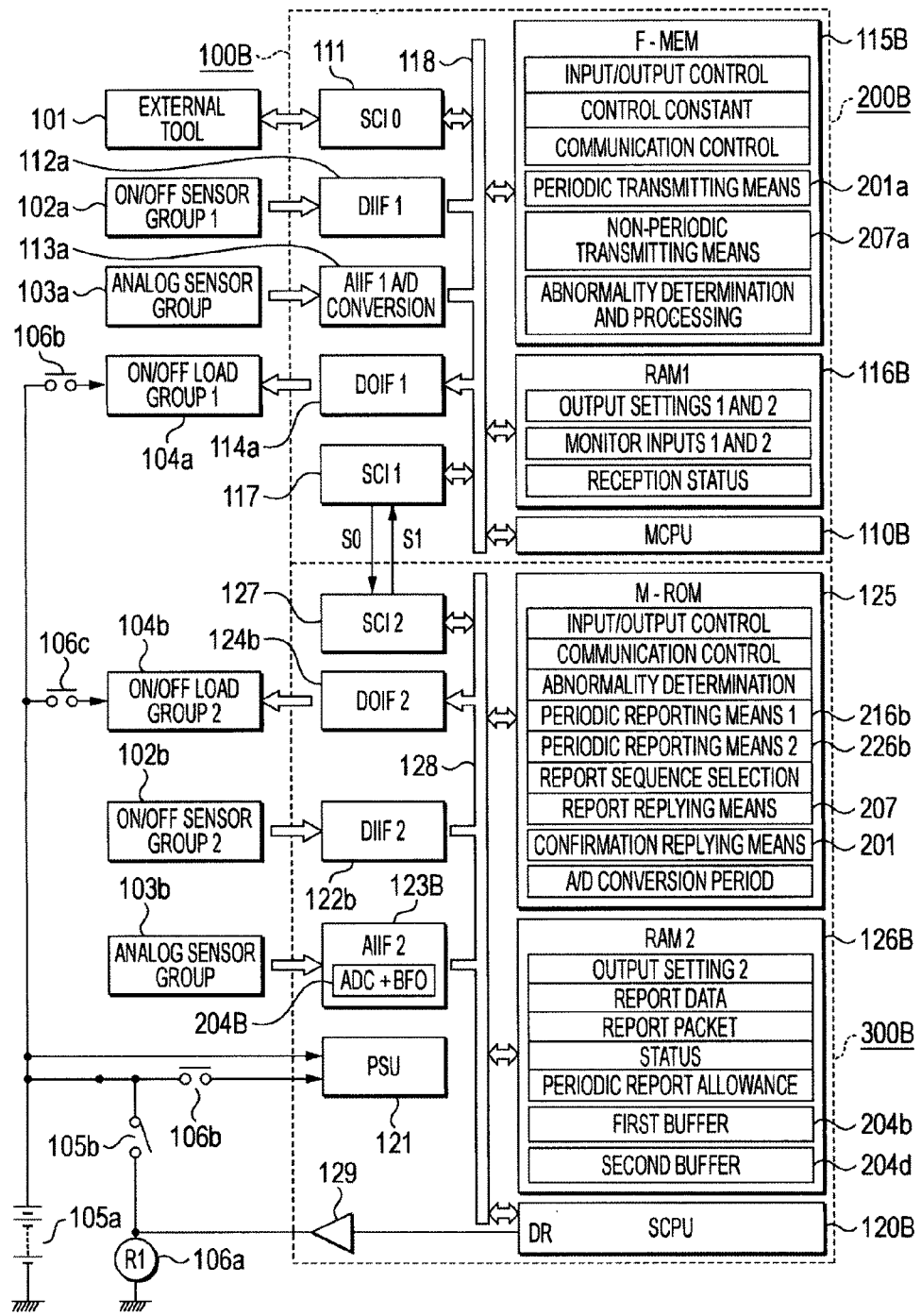
FIG. 5 is a total block diagram showing an on-vehicle electronic control device according to a second exemplary embodiment of this invention.

FIG. 5 is a total block diagram showing an on-vehicle electronic control device 100B according to the second exemplary embodiment of this invention.

In FIG. 5, the main differences are that, whereas the communication control circuit unit 120A of FIG. 1 was configured by an integrated circuit element using a logic circuit, the on-vehicle electronic control device 100B of FIG. 5 includes an auxiliary CPU 120B and simple input/output control means is added to the second control circuit unit, but the same reference numerals represent the same or corresponding portions.

In FIG. 5, the on-vehicle control device 100B is configured by a first control circuit unit 200B and a second control circuit unit 300B. A microprocessor 110B serving as a main CPU that is a main configural element of the first control circuit unit 200B is configured to cooperate with a nonvolatile program memory 115B such as a flash memory in which control programs and control constants are stored and a RAM memory 116B for arithmetic processing.

The microprocessor serving as the auxiliary CPU 120B that is a main configural element of the second control circuit unit 300B cooperates with an auxiliary program memory 125 resulting from a mask ROM memory or the like, and a program serving as input/output control means in the second control circuit unit 300B and a communication control program are stored in the auxiliary program memory 125.

An auxiliary RAM memory 126B that cooperates with the auxiliary CPU 120B includes the data memory of the on-vehicle electronic control device of FIG. 1.

Other than that, the configuration of the input/output circuit unit and the configuration of the external connection circuit are the same as those in FIG. 1, but a multichannel A/D converter 204B included in an indirect analog input interface circuit 123B internally houses an accompanying buffer memory. As a result, the multichannel A/D converter 204B is configured to sequentially write the A/D conversion data of each channel between the A/D converter and the accompanying buffer memory and transfer the A/D conversion data from the accompanying buffer memory to a first buffer memory 204b inside the auxiliary RAM memory 126B in accompaniment with the completion of A/D conversion of all channels.

Of the configural elements of the first control circuit unit 200B, the microprocessor 110B, the program memory 115B, the RAM memory 116B, the serial interface 111, the input circuit-use dataselector, the multichannel A/D converter, the output circuit-use latch memory, and the first serial/parallel converter 117 are integrated as a first integrated circuit element, and just large parts such as heat parts, condensers, and power transistors are disposed outside the integrated circuit element.

Further, of the configural elements of the second control circuit unit 300B, the auxiliary CPU 120B serving as the communication control circuit unit, the auxiliary program memory 125, the auxiliary RAM memory 126B serving as the data memory, the input circuit-use data selector, the multichannel A/D converter 204B, the output circuit-use latch memory, the second serial/parallel converter 127, and the constant voltage control circuit unit in the power supply unit 121 are integrated as a second integrated circuit element, and just large parts such as heat parts, condensers, and power transistors are disposed outside the integrated circuit element.

It will be noted that a communication control functional block diagram in this second exemplary embodiment is substantially the same as that shown in FIG. 2, but the differences will be described later in the description of the flow charts of FIG. 6 to FIG. 9.

Further, the configurations of the various packets for communication are the same as those in FIG. 3.

Figure 6:
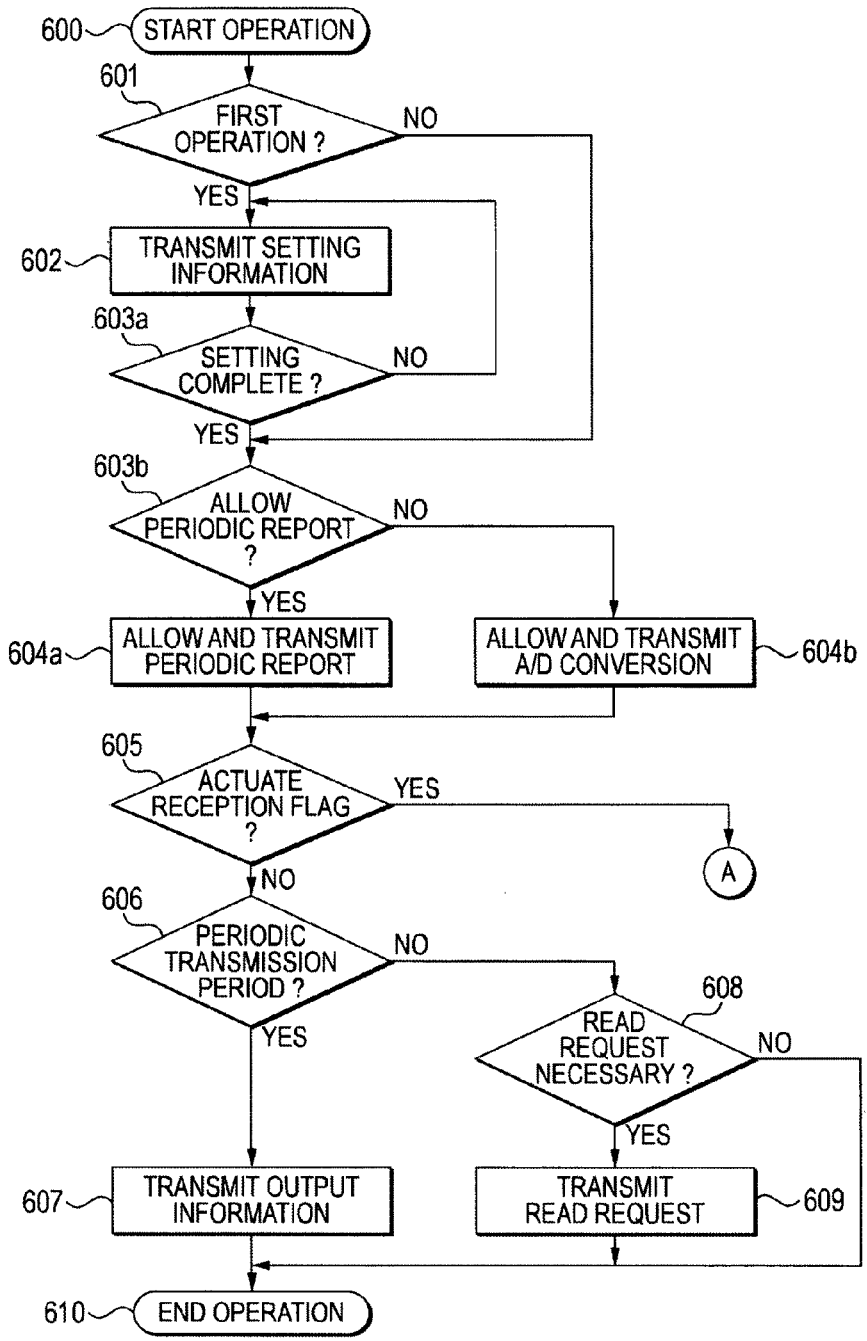
FIG. 6 is a flow chart showing transmission control operation of a first control circuit unit of the on-vehicle electronic control device according to the second exemplary embodiment of this invention.

FIG. 6 is a flow chart showing transmission control operation of the first control circuit unit of the on-vehicle electronic control device according to the second exemplary embodiment of this invention.

Figure 7:
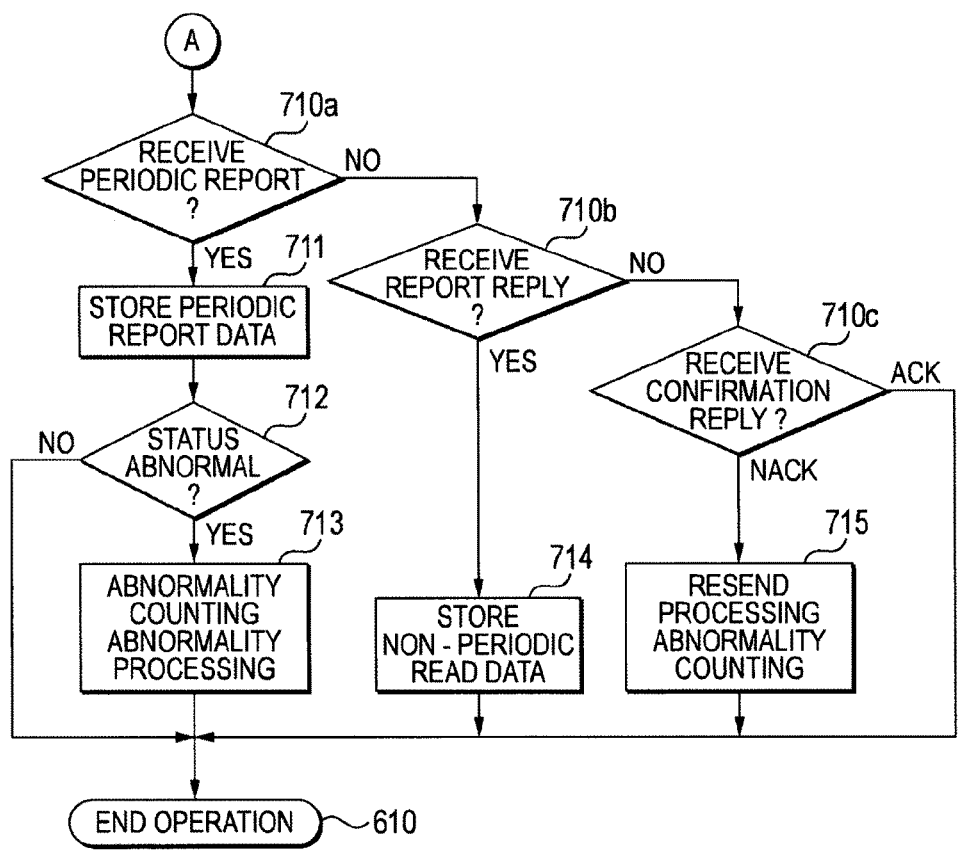
FIG. 7 is a flow chart showing reception control operation of the first control circuit unit of the on-vehicle electronic control device according to the second exemplary embodiment of this invention.

FIG. 7 is a flow chart showing reception control operation of the first control circuit unit of the on-vehicle electronic control device according to the second exemplary embodiment of this invention.

Figure 8:
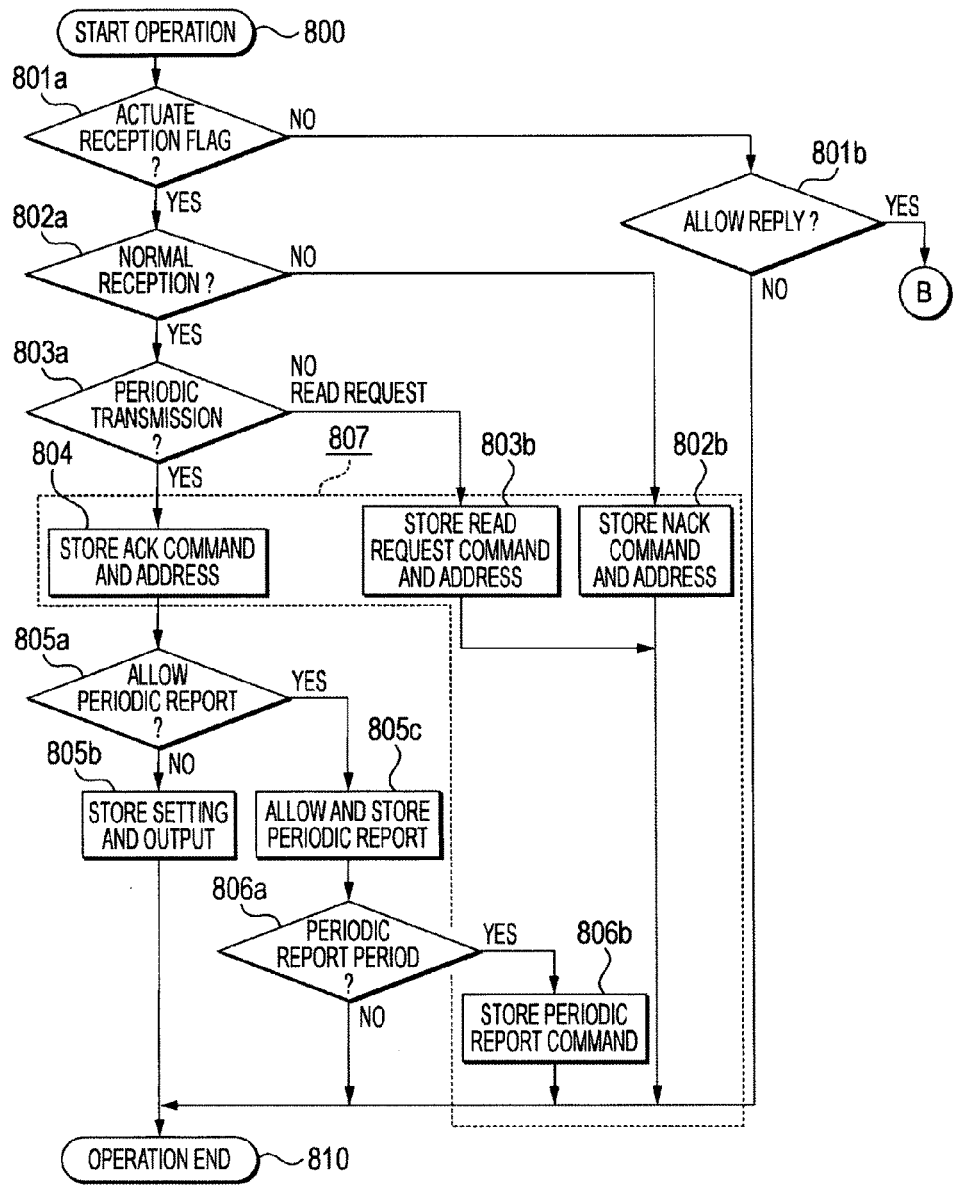
FIG. 8 is a flow chart showing reception control operation of a second control circuit unit of the on-vehicle electronic control device according to the second exemplary embodiment of this invention.

FIG. 8 is a flow chart showing reception control operation of the second control circuit unit of the on-vehicle electronic control device according to the second exemplary embodiment of this invention.

Figure 9:
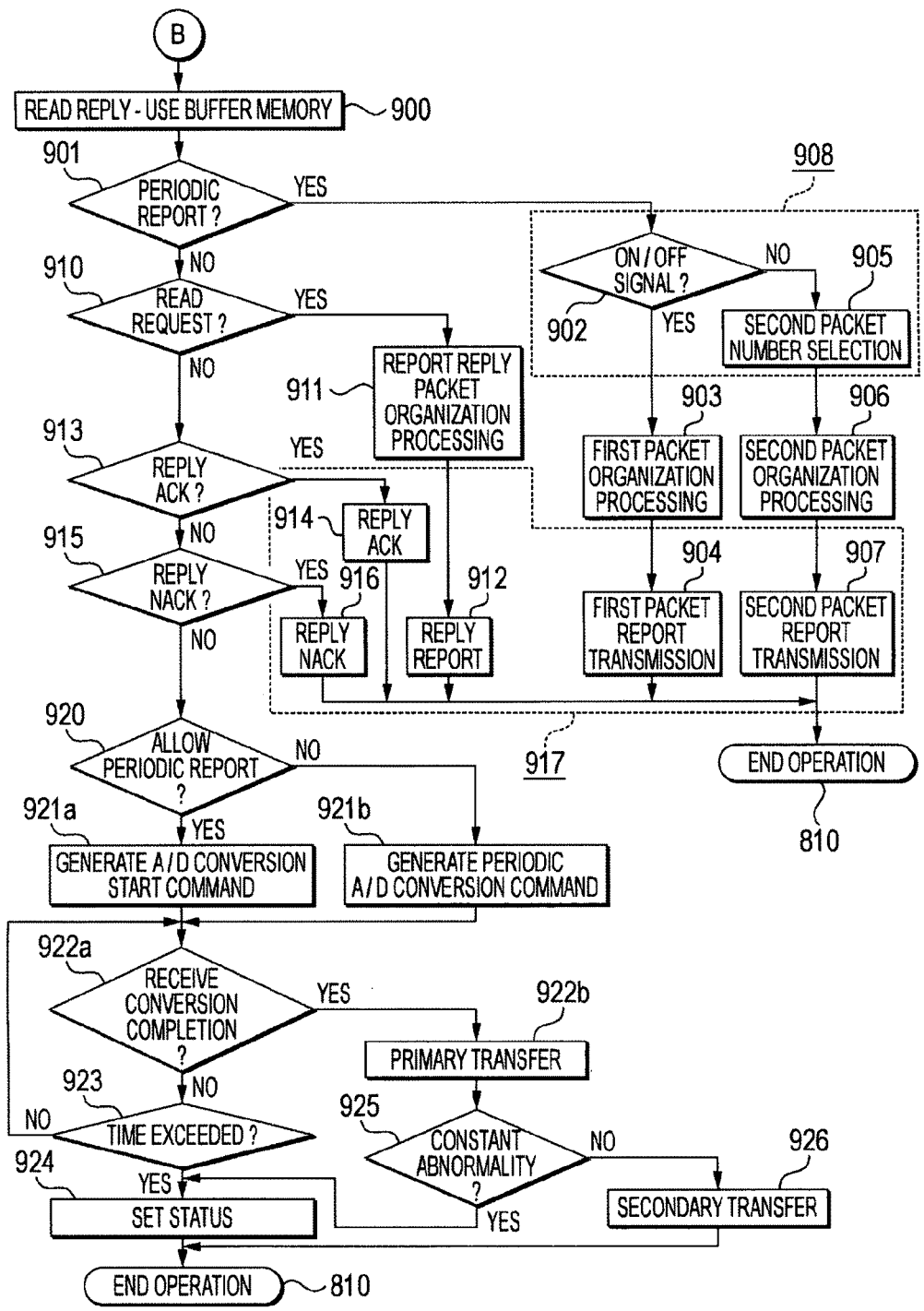
FIG. 9 is a flow chart showing transmission control operation of the second control circuit unit of the on-vehicle electronic control device according to the second exemplary embodiment of this invention.

FIG. 9 is a flow chart showing transmission control operation of the second control circuit unit of the on-vehicle electronic control device according to the second exemplary embodiment of this invention.

(2) Detailed Description of Action and Operation

Next, FIG. 6 and FIG. 7, which are flow charts describing communication control operation of the first control circuit unit 200B of FIG. 5, will be described.

First, in FIG. 6 which shows transmission control operation, step 600 is a step where the microprocessor 110B starts communication control operation, next step 601 is a step of determining whether or not this is first operation after switching the power ON by determining the operational state of an unillustrated flag. When the determination of step 601 is YES and this is first operation, then the flow moves to step 602, and when this is not first operation, then the flow moves to step 603b.

Step 602 is a step serving as the periodic transmitting means 201a. In step 602, the various control constants are transferred from the program memory 115B to the data memory 126B, and the second control circuit unit 300B stores and saves the control constants by the setting information storage block 202b (see FIG. 2).

Next step 603a is a step of determining whether or not transfer of the various control constants by step 602 has been completed. When transfer is not completed, then the flow returns to step 602, and when transfer is completed, then the flow moves to step 603b. Step 603b is a step of determining whether or not to allow periodic reporting. When periodic reporting is to be allowed, then the flow moves to step 604a and the periodic transmission packet 211aa for allowing periodic reporting is transmitted, and when periodic reporting is not to be allowed, then the flow moves to step 604b and the periodic transmission packet 212aa for allowing A/D conversion is transmitted.

Step 605, which is executed after step 604a or 604b, is a step of determining the operational state of a reception flag that operates when the first serial/parallel converter 117 has received report data from the second serial/parallel converter 127. When the determination of step 605 is that the report data have not been received, then the flow moves to step 606, and when the report data have been received, then the flow moves to step 710a of FIG. 7.

Step 606 is a step of determining whether this is the first periodic transmission period or measuring whether or not a predetermined amount of time has elapsed since the previous periodic transmission to determine whether or not the periodic transmission period has arrived. When the determination of step 606 is YES, then the flow moves to step 607, and when the determination is NO, then the flow moves to step 608.

Step 607 is a step serving as the periodic transmitting means 201a. In step 607, the control output signals stored in the RAM memory 116B as the processing result of the microprocessor 110B are transmitted to the data memory 126B, and the second control circuit unit 300B stores the control output by the output information storage block 202a (see FIG. 2) and drives the second electric load group 104b.

Step 608 is a step of determining whether or not it is necessary to perform a read request with respect to the second control circuit unit 300B.

Step 609 is a step serving as the non-periodic transmitting means 207a executed when the determination of step 608 is YES and it is necessary to perform a read request. In step 609, the non-periodic transmission packet 207aa is transmitted.

It will be noted that the non-periodic transmitting means 207a is summarized as needed in order for the first control circuit unit 200B to read and confirm monitor input data of a designated address with respect to the second control circuit unit 300B and to read and check setting and output data that have been written in the data memory 126B by the periodic transmitting means 201a in step 602 and step 607.

Step 610 is an operation end step, and the flow again cyclically returns to start operation step 600 when the determination of step 608 is NO and a read request is not necessary or when the flow continues to step 607 or 609 and the execution of other control operation has been performed.

Next, in FIG. 7 which shows reception control operation, step 710a is a determination step executed when the determination of step 605 of FIG. 6 is YES and the reception flag operates. In step 710a, it is determined whether or not a periodic report has been received from the second control circuit unit 300B. When the periodic report has been received, then the flow moves to step 711, and when the periodic report has not been received, then the flow moves to step 710b.

In step 710b, it is determined whether or not a report reply corresponding to a read request has been received. When a report reply has been received, then the flow moves to step 714, and when a report reply has not been received, then it is determined that a confirmation reply corresponding to periodic transmission has been received and the flow moves to step 710c.

In step 710c, the flow moves to step 715 when the confirmation reply with respect to periodic transmission is a confirmation reply that it was anomalous reception and NACK, and the flow moves to operation end step 610 when it is a confirmation reply that it was normal reception and ACK.

In step 711 and step 714, as indicated in the report information storage block 206d (see FIG. 2), the reported information is written and saved to a predetermined address of the RAM memory 116B, and the flow moves to operation end step 610 after step 714.

Step 712, which is executed after step 711, is a step of monitoring the status information included in the periodic report packet to determine whether or not the status is abnormal. When the status is abnormal, then the flow moves to step 713, and when the status is not abnormal, then the flow moves to operation end step 610.

In step 713, the number of occurrences of status abnormality is counted. When the counted value exceeds a predetermined value, then the multichannel A/D converter 204B and the contents of the first and second buffer memories 204b and 204d are reset and the flow moves to operation end step 610.

Step 715 is an abnormality processing step of retransmitting the periodic transmission data that has become an abnormality confirmation reply or counting the number of occurrences of the abnormality and resetting the second control circuit unit 300B when the counted value exceeds a predetermined value. The flow moves to operation end step 610 after step 715.

To more generally describe the operations of FIG. 6 and FIG. 7, steps 602 and 607 corresponding to the periodic transmitting means 201a of FIG. 2 are write setting means that periodically transmit, by the periodic transmission packet 201aa, the constant setting data and the control output data from the first control circuit unit 200B to the second control circuit unit 300B and store, in the data memory 126B, the setting and output data in the second control circuit unit 300B.

Step 604a corresponding to the periodic report allowing means 211a of FIG. 2 is write setting means that is transmitted by the periodic transmission packet 211a to the data memory 126B of a predetermined address disposed in the second control circuit unit 300B and stores command data for allowing the second control circuit unit 300B to transmit the periodic report.

Step 609 corresponding to the non-periodic transmitting means 207a of FIG. 2 is read requesting means that is summarized as needed in order for the first control circuit unit 200B to read and confirm monitor input data of a designated address with respect to the second control circuit unit 300B and to read and check write save data that have been written and set by the periodic transmitting means 602.

Step 604b corresponding to the A/D conversion allowing means 212a of FIG. 2 is write setting means that is transmitted by the periodic transmission packet 212aa to the data memory of a predetermined address disposed in the second control circuit unit 300B and stores command data for allowing the second control circuit unit 300B to generate an A/D conversion start command with respect to the multichannel A/D converter 204B, so that A/D conversion by the multichannel A/D converter 204B is periodically executed even in a state where periodic reporting is not being allowed by the periodic report allowing means 604a and report reply of the A/D conversion data corresponding to the non-periodic transmitting means 609 can be performed.

Step 713 corresponding to the status abnormality processing means 206e of FIG. 2 is means that acts when the status information included in the first or second report packet 216bb or 226bb includes abnormality information of the multichannel A/D converter 204B resulting from later-described conversion abnormality determining means 923 and 925, counts the number of times abnormality information has been received, with abnormality processing being executed when the number of times abnormality information is received exceeds a predetermined number of times, and the abnormality processing is at least one of processing that resets the multichannel A/D converter 204B and the first and second buffer memories 204b and 204d and processing that resets the entire second control circuit unit 300B.

Next, FIG. 8 and FIG. 9, which are flow charts for describing communication control operation of the second control circuit unit 300B of FIG. 5, will be described.

First, in FIG. 8 which shows reception control operation, step 800 is a step where the auxiliary CPU 120B starts communication control operation, and next step 801a is a step of determining the operational state of a reception flag that operates when the second serial/parallel converter 127 has received transmission data from the first serial/parallel converter 117. When the determination of step 801a is that the transmission data have been received, then the flow moves to step 802, and when the transmission data have not been received, then the flow moves to step 801b.

Step 801b is a step of determining whether or not reply to the microprocessor 110B is being allowed by the logic label of a reply allowance signal commanded via an unillustrated direct signal line with respect to the auxiliary CPU 120B from the microprocessor 110B. When reply is being allowed, then the flow moves to step 900 of FIG. 9, and when reply is not being allowed, then the flow moves to operation end step 810.

In operation end step 810, the flow cyclically moves again to operation start step 800 after other control operation is executed.

In step 802a, it is determined whether or not there is a code error in the data that have been transmitted from the parent station. When the data are normal, then the flow moves to step 803a, and when the data are not normal, then the flow moves to step 802b.

It will be noted that the determination of whether or not there is a code error is performed by sumcheck means that determines that the data are normal when the result of adding all of the frame data that have been transmitted from the parent station is zero and determines that the data are abnormal when the result is not zero.

In step 802b, a NACK command 62H and the address that had been designated by the periodic transmission command are stored with respect to an unillustrated reply-use buffer memory, and then the flow moves to operation end step 810.

Step 803a is a step of determining whether or not the received data are periodic transmission data. When the determination of step 803a is NO and the received data are a read request resulting from the non-periodic transmitting means 207a, then the flow moves to step 803b, and when the determination is YES and the received data are a periodic transmission, then the flow moves to step 804.

In step 803b, the read request command and the address information for report reply are stored with respect to an unillustrated reply-use buffer memory, and then the flow moves to operation end step 810.

In step 804, an ACK command 61H and the address that had been designated by the periodic transmission command are stored with respect to an unillustrated reply-use buffer memory, and then the flow moves to step 805a.

In step 805a, it is determined whether or not the received data are a command to allow period report by the periodic transmission packet 211aa. When the received data are a command to allow periodic report, then the flow moves to step 805c, and when the received data are not a command to allow periodic report, then the flow moves to step 805b.

In step 805b, writing of output information or setting information is performed with respect to the auxiliary RAM memory 126B in accordance with the contents of the received periodic report packet, and then the flow moves to operation end step 810.

It will be noted that step 805b corresponds to the output information writing block 202a and the setting information writing block 202b in FIG. 2.

In step 805c, the periodic report allowance information is stored with respect to the auxiliary RAM memory 126B of a specific address, and then the flow moves to step 806a.

In step 806a, a determination of YES is performed at the point in time when the periodic report information has been received and thereafter in periods of every 10 msec, for example, and then the flow moves to step 806b, and a determination of NO is performed at other timings and then the flow moves to operation end step 810.

In step 806b, the periodic report command information is stored with respect to an unillustrated reply-use buffer memory, and then the flow moves to operation end step 810.

It will be noted that the aforementioned reply-use buffer memories configure a FIFO table with a first-in first-out structure, and the read data are deleted each time they are sequentially read.

Step block 807 configured by steps 802b, 803b, 804, and 806b represents a step of storing data in these reply-use buffer memories.

Next, in FIG. 9 which shows transmission control operation, step 900 is a step that is executed when step 801b of FIG. 8 performs a determination of YES and reply is allowed by the microprocessor 110B and which reads head data stored in the FIFO table by the aforementioned step block 807. In next step 901, it is determined whether or not the head data read in step 900 are the periodic report command read in step 806b of FIG. 8. When the data are the periodic report command, then the flow moves to step 902, and when the data are not the periodic report command, then the flow moves to step 910.

Step 902 is a determination step where determination is alternately reversed by whether or not the previous periodic report was ON/OFF signal input or analog input. When the current determination is ON/OFF signal input, then a determination of YES is performed and the flow moves to step 903, and when the current determination is analog input, then a determination of NO is performed and the flow moves to step 905.

In step 903, the first report packet 216bb is organized and that first report packet 216bb is transmitted by next step 904. Then the flow moves to operation end step 810.

Step 905 is a step of sequentially updating and selecting the channel number of the A/D conversion data stored in the second buffer memory 204d. In next step 906, the second report packet 226bb is organized in correspondence to the input channel selected in step 905, and the second report packet 226bb is transmitted by next step 907. Then the flow moves to operation end step 810.

Step block 908 is configured by step 902 and step 905 and serves as report sequence selecting means.

In step 910, it is determined whether or not the head data read in step 900 is the report reply command read in step 803b of FIG. 8. When the head data is the report reply command, then the flow moves to step 911, and when the head data is not the report reply command, then the flow moves to step 913.

In step 911, the report reply packet 207bb is organized and that report reply command 207bb is transmitted in next step 912. Then the flow moves to operation end step 810.

In step 913, it is determined whether or not the head data read in step 900 is the ACK command written in step 804 of FIG. 8. When the head data is the ACK command, then the flow moves to step 914, and when the head data is not the ACK command, then the flow moves to step 915.

In step 914, the ACK command is confirmed and sent back by the confirmation reply packet 201bb, and then the flow moves to operation end step 810.

In step 915, it is determined whether or not the head data read in step 900 is the NACK command written in step 802b of FIG. 8. When the head data is the NACK command, then the flow moves to step 916, and when the head data is not the NACK command, then the flow moves to step 920.

In step 916, the NACK command is confirmed and sent back by the confirmation reply packet 201*bb*, and then the flow moves to operation end step 810.

Step block 917 configured by steps 904, 907, 912, 914, and 916 is a step block in which the steps of actual reply operation corresponding to the reply-use command stored in step 807 of FIG. 8 are aggregated.

In step 920, it is determined whether or not the periodic report allowance command has been stored in step 805*c*. When periodic report is allowed, then the flow moves to step 921*a*, and when periodic report is not allowed, then the flow moves to step 921*b*.

In step 921*a*, it is determined whether or not the timing is the timing to generate the A/D conversion start commands ADen1 and ADen2 shown in the time chart of FIG. 4. When the timing is the generation timing, then the A/D conversion start commands ADen1 and ADen2 are generated and the flow moves to step 922*a*, and when the timing is not the generation timing, then the flow moves as is to step 922*a*.

In step 921*b*, it is determined whether or not the timing is the timing to generate the A/D conversion start command ADen3 shown in the time chart of FIG. 4. When the timing is the generation timing, then the A/D conversion start command ADen3 is generated and the flow moves to step 922*a*, and when the timing is not the generation timing, then the flow moves as is to step 922*a*.

In step 922*a*, it is determined whether or not an A/D conversion completion signal has been received in accompaniment with the multichannel A/D converter 204B completing A/D conversion of all channels on the basis of the A/D conversion start command generated in step 921*a* or step 921*b* and the A/D conversion data of all channels being stored with respect to the accompanying buffer memory disposed in the multichannel A/D converter 204B. When conversion has not been completed, then the flow moves to step 923, and when conversion has been completed, then the flow moves to step 922*b*.

In step 922*b*, the A/D conversion data of all channels stored in the accompanying buffer memory are transferred to the first buffer memory 204*b* inside the auxiliary RAM memory 126B, and then the flow moves to step 925.

In step 923, it is determined whether or not the amount of time from when the A/D conversion start command has been generated in step 921 to until the A/D conversion completion signal is received exceeds a predetermined threshold. When this amount of time does not exceed the predetermined threshold, then the flow returns to step 922*a*, and when the amount of time exceeds the predetermined threshold, then the flow moves to step 924.

In step 924, abnormality generation information of time excess is stored in the status memory, and then the flow moves to operation end step 810.

In step 925, it is determined whether or not the A/D conversion value of each channel transferred to the first buffer memory 204*b* by step 922*b* exceeds predetermined upper and lower limits, or whether or not the A/D conversion value of a predetermined sample voltage inputted to a specific channel is within a predetermined precision range. When the A/D conversion value is abnormal, then the flow moves to step 924, and when the A/D conversion value is not abnormal, then the flow moves to step 926.

In step 926, the A/D conversion data of all channels stored in the first buffer memory 204*b* are transferred to the second buffer memory 204*d* inside the auxiliary RAM memory 126B, and then the flow moves to operation end step 810.

It will be noted that, in the case of the exemplary embodiment of FIG. 2, the A/D conversion data are sequentially stored in the first buffer memory 204*b* each time the multichannel A/D converter 204A executes A/D conversion of each channel, but in the exemplary embodiment of FIG. 5, the A/D conversion data of each channel, are sequentially stored with respect to the accompanying buffer memory disposed in the multichannel A/D converter 204B, and transfer to the first buffer memory 204*b* is performed collectively after A/D conversion data of all channels are obtained.

Further, in the case of the exemplary embodiment of FIG. 2, interlock processing resulting from the packet generation monitoring means 205*f* is performed because organization processing of the communication-use packets and transfer processing from the first buffer memory 204*b* to the second buffer memory 204*d* proceed in parallel, but in the case of the exemplary embodiment of FIG. 5, special interlock processing becomes unnecessary because the organization processing of the communication-use packets and the transfer processing from the first buffer memory 204*b* to the second buffer memory 204*d* are done in time-division sequence by the auxiliary CPU 120B.

To more generally describe FIG. 8 and FIG. 9, in FIG. 8, writing of the reply-use command to the reply-use buffer memory represented by step block 807 is done, and in FIG. 9, sequential reply is executed by step block 917 and the contents of the reply-use buffer memories are sequentially deleted.

Step 904 corresponding to the first periodic reporting means 216*b* shown in FIG. 2 is means that periodically reports ON/OFF input information by the first report packet 216*bb*.

Step 907 corresponding to the second periodic reporting means 226*b* shown in FIG. 2 is means that periodically reports analog input information by the second report packet 226*bb*.

Step block 908 corresponding to the report sequence selecting means 206*c* shown in FIG. 2 is selection control means that sequentially selects between the first periodic reporting means 216*b* that collectively reports plural ON/OFF information inputted from the indirect switch signal input circuit 122*b* and the second periodic reporting means 226*b* of plural times that reports digital information of a predetermined number of channels digitally converted by the multichannel A/D converter 204B and prioritizes the first periodic reporting means 216*b* in a relationship where at least the second periodic reporting means 226*b* is not continuous to perform periodic reporting.

Step 912 corresponding to the report replying means 207*b* shown in FIG. 2 is means that performs report reply by the report reply packet 207*bb* that has organized the monitor input data of the designated address or the write save data as a confirmation reply with respect to the fact that the second control circuit unit 300B has received the non-periodic transmission data.

Step 921*a* corresponding to the A/D conversion period designating means 205*a* and 205*b* shown in FIG. 2 is conversion controlling means that designate an A/D conversion start period in a relationship where the series of A/D conversion operations by the multichannel A/D converter 204B are completed until a period in which the second control circuit unit 300B generates an A/D conversion start command of plural times with respect to the multichannel A/D converter 204B and transmits the next second report packet 226*bb* immediately after the second control circuit unit 300B has transmitted the first report packet 216*bb* or after a predetermined amount of time after transmitting the first report packet 216*bb* after receiving the periodic report allowance command by periodic report allowing means 604*a*.

Step 921*b* corresponding to the periodic A/D conversion commanding means 205*h* shown in FIG. 2 is means that supplies the A/D conversion command with respect to the multichannel A/D converter 204B periodically in time intervals shorter than the shortest period of periodic reporting.

Step 923 corresponding to the time excess determining means 205*c* shown in FIG. 2 is conversion abnormality determining means that measures the amount of time required for the multichannel A/D converter 204B to generate an A/D conversion finish signal of all channels after the A/D conversion start command has been supplied with respect to the multichannel A/D converter 204B, and determines that the multichannel A/D converter 204B is abnormal when this required amount of time exceeds a predetermined value.

Step 925 corresponding to the conversion constant abnormality determining means 205*d* shown in FIG. 2 is conversion abnormality determining means that determines as abnormal when the constant sample voltage 204*a* is applied as one analog input signal inputted to the multichannel A/D converter 204B and the digital conversion value with respect to this sample voltage 204*a* is outside a predetermined range of allowable error.

Step 924 corresponding to the abnormality reporting means 205*e* shown in FIG. 2 is means that acts when abnormality determination of the multichannel A/D converter 204B has been done by the conversion abnormality determining means 923 and 925 and periodically reports to the first control circuit unit 200B by writing the status information in the data memory 126B of a predetermined address and adding this status information to the first or second periodic report packet 216*bb* or 226*bb*.

Step 926 corresponding to the data update commanding means 205*g* shown in FIG. 2 is means that acts between the first and second buffer memories 204*b* and 204*d* and allows data transfer from the first buffer memory 204*b* to the second buffer memory 204*d* when determination by the conversion abnormality determining means 923 and 925 is normal.

(3) Summary and Characteristics of Configuration

As is apparent from the above description, the on-vehicle electronic control device according to the second exemplary embodiment of this invention is an on-vehicle electronic control device 100B configured such that a first control circuit unit 200B including a program memory 115B that includes input/output control means and communication control means, a RAM memory 116B for arithmetic processing, a microprocessor 110B that cooperates with the program memory 115B, and a first serial/parallel converter 117 and a second control circuit unit 300B including a communication control circuit unit 120B for exchanging at least monitor and control signals, an indirect switch signal input circuit 122*b*, an indirect analog signal input circuit 123B including a multichannel A/D converter 204B, a data memory 126B, and a second serial/parallel converter 127 serially exchange monitor and control signals with each other via the first and second serial/parallel converters 117 and 127, wherein the first control circuit unit 200B further includes periodic transmitting means 602 and 607, and the second control circuit unit 300B further includes periodic reporting means 904 and 907, conversion abnormality determining means 923 and 925, abnormality reporting means 924, data update commanding means 926, and first and second buffer memories 204*b* and 204*d*.

The periodic transmitting means 602 and 607 are means that transmit, by a periodic transmission packet 201*aa*, constant setting data and control output data periodically from the first control circuit unit 200B to the second control circuit unit 300B and store, in the data memory 126B, the setting and output data in the second control circuit unit 300B.

The periodic reporting means 904 and 907 are means that report and send back, by periodic report packets 216*bb* and 226*bb*, monitor input data and status information from the second control circuit unit 300B to the first control circuit unit 200B such that the first control circuit unit 200B stores the periodic report data in the RAM memory 116B.

The conversion abnormality determining means 923 and 925 are means that determine that the multichannel A/D converter 204B is abnormal by detecting that the A/D conversion value resulting from the multichannel A/D converter 204B is outside the range of predetermined upper and lower limits or that the amount of time required for A/D conversion is equal to or greater than a predetermined value.

The abnormality reporting means 924 is means that acts when abnormality determination of the multichannel A/D converter 204B has been done by the conversion abnormality determining means 923 and 925 and periodically reports to the first control circuit unit 200B by writing status information in the data memory 126B of a predetermined address and adding this status information to the periodic report packets 216*bb* and 226*bb*.

The data update commanding means 926 is means that acts between the first and second buffer memories 204*b* and 204*d* and allows data transfer from the first buffer memory 204*b* to the second buffer memory 204*d* when determination by the conversion abnormality determining means 923 and 925 is normal.

The first buffer memory 204*b* is a data memory in which are primarily stored A/D conversion data of all channels resulting from the multichannel A/D converter 204B.

The second buffer memory 204*d* is a data memory to which are collectively transferred the contents of the first buffer memory 204*b* at a point in time before the multichannel A/D converter 204B completes A/D conversion of all channels and starts next A/D conversion and when the data update commanding means 926 is allowing data updating, and the periodic report packet 226*bb* is organized on the basis of the contents of the second buffer memory 204*d*.

The second control circuit unit 300B further includes an auxiliary CPU 120B with which an auxiliary program memory 125 and an auxiliary RAM memory 126B for arithmetic processing serving as the data memory cooperate. The auxiliary CPU 120B configures the communication control circuit unit and is internally housed in the second control circuit unit 300B together with the indirect switch signal input circuit 122*b*, the indirect analog signal input circuit 123B including the multichannel A/D converter 204B, an indirect output signal-use interface circuit 124*b*, and the second serial/parallel converter 127. The auxiliary CPU 120B is a microprocessor that transmits, to the first control circuit unit 200B via the second and first serial/parallel converters 127 and 117, indirect input signals SI associated with signals inputted via the indirect switch signal input circuit 122*b* and the indirect analog signal input circuit 123B and drives a second electric load group 104*b* connected to the indirect output signal-use interface circuit 124*b* by an output associated with indirect output signals SO received from the first control circuit unit 200B via the first and second serial/parallel converters 117 and 127.

Consequently, the second control circuit unit performs logical combination of numerous indirect switch signal inputs and transmits the requisite minimum of signal inputs to the first control circuit unit, and adds inter lock control logic to the control signal from the first control signal unit to drive the second electric load, so that the second control circuit unit can share some input/output control functions, improve control performance overall, and easily change control contents by changing the contents of the auxiliary program memory.

The auxiliary RAM memory 126B includes the first and second buffer memories 204b and 204d, the multichannel A/D converter 204B includes an accompanying buffer memory that stores the A/D conversion data of all channels, and the contents of the accompanying buffer memory are transferred to the first buffer memory 204b in accompaniment with the completion of A/D conversion of all channels.

Consequently, it is not necessary to supply the A/D conversion data to the auxiliary CPU each time the multichannel A/D converter performs A/D conversion for one channel, but rather the A/D conversion data can be transferred to the first buffer memory collectively after A/D conversion of all channels is completed, and the control burden of the auxiliary CPU is alleviated.

Various modifications and alterations of this invention will be apparent to those skilled in the art without departing from the scope and spirit of this invention, and it should be understood that this is not limited to the illustrative embodiments set forth herein.

What is claimed is:

1. An on-vehicle electronic control device configured such that
   a first control circuit unit including a program memory that includes input/output control means and communication control means, a RAM memory for arithmetic processing, a microprocessor that cooperates with the program memory, and a first serial/parallel converter and
   a second control circuit unit including a communication control circuit unit for exchanging at least monitor and control signals with the first control circuit unit, an indirect switch signal input circuit, an indirect analog signal input circuit including a multichannel A/D converter, a data memory, and a second serial/parallel converter
   serially exchange monitor and control signals with each other via the first and second serial/parallel converters, wherein
   the first control circuit unit further includes periodic transmitting means,
   the second control circuit unit further includes periodic reporting means, conversion abnormality determining means, abnormality reporting means, data update commanding means, and first and second buffer memories,
   the periodic transmitting means is means that transmits, by a periodic transmission packet, constant setting data and control output data periodically from the first control circuit unit to the second control circuit unit and writes and sets, so as to store in the data memory, the constant setting data and the control output data in the second control circuit unit,
   the periodic reporting means are means that report and send back, by a periodic report packet, monitor input data and status information from the second control circuit unit to the first control circuit unit such that the first control circuit unit stores the periodic report data in the RAM memory,
   the conversion abnormality determining means are means that determine that the multichannel A/D converter is abnormal by detecting that the A/D conversion value resulting from the multichannel A/D converter is outside the range of predetermined upper and lower limits or that the amount of time required for A/D conversion is equal to or greater than a predetermined value,
   the abnormality reporting means is means that acts when abnormality determination of the multichannel A/D converter has been done by the conversion abnormality determining means and periodically reports to the first control circuit unit by writing status information in a data memory of a predetermined address and adding this status information to the periodic report packet,
   the data update commanding means is means that acts between the first and second buffer memories and allows data transfer from the first buffer memory to the second buffer memory when determination by the conversion abnormality determining means is normal,
   the first buffer memory is a data memory in which are primarily stored A/D conversion data of all channels resulting from the multichannel A/D converter,
   the second buffer memory is a data memory to which are collectively transferred the contents of the first buffer memory at a point in time before the multichannel A/D converter completes A/D conversion of all channels and starts next A/D conversion and when the data update commanding means is allowing data updating, and
   the periodic report packet is organized on the basis of the contents of the second buffer memory.

2. The on-vehicle electronic control device of claim 1, wherein
   the second control circuit unit further includes report sequence selecting means,
   the report sequence selecting means is means that sequentially selects between first periodic reporting means that reports, by a first report packet, plural ON/OFF information inputted from the indirect switch signal input circuit and second periodic reporting means that reports, by plural second report packets, digital information of a predetermined number of channels digitally converted by the multichannel A/D converter, and prioritizes the first report packet in a relationship where at least the second report packets are not continuous to perform periodic reporting, and
   the status information is written and organized in the first report packet or in both of the first and second report packets and is periodically reported.

3. The on-vehicle electronic control device of claim 1, wherein
   the conversion abnormality determining means includes conversion constant abnormality determining means,
   the conversion constant abnormality determining means is means that determines as abnormal when a constant sample voltage is applied as one analog input signal inputted to the multichannel A/D converter and a digital conversion value with respect to this sample voltage is outside the range of predetermined allowable error, and
   an output voltage of a power supply unit that is powered by an on-vehicle battery and generates a predetermined control-use stabilized voltage is applied to a reference voltage terminal of the multichannel A/D converter.

4. The on-vehicle electronic control device of claim 3, wherein
   the conversion abnormality determining means includes time excess determining means, and
   the time excess determining means is means that measures the amount of time required for the multichannel A/D converter to generate an A/D conversion finish signal of all channels after an A/D conversion start command has been supplied to the multichannel A/D converter and determines that the multichannel A/D converter is abnormal when this required amount of time exceeds a predetermined value.

5. The on-vehicle electronic control device of claim 2, wherein the program memory disposed in the first control circuit unit further includes a control program serving as status abnormality processing means, and the status abnormality processing means acts when the status information included in the first or second report packet includes abnormality information of the multichannel A/D converter resulting from the conversion abnormality determining means and counts the number of times that the abnormality information is received, with abnormality processing being performed when the number of times that the abnormality information is received exceeds a predetermined number of times, and the abnormality processing is at least one of processing that resets the multichannel A/D converter and the first and second buffer memories and processing that resets the entire second control circuit unit.

6. The on-vehicle electronic control device of claim 2, wherein the second report packet is configured by plural frames of a bit length shorter than the bit length of the A/D conversion data resulting from the multichannel A/D converter, the A/D conversion data are frame-divided into high-order bits and low-order bits and organized, the first buffer memory is a data memory of a long bit length including a number of bits equal to or less than 1.5 times the frame length of the second report packet and in which the A/D conversion data of all channels resulting from the multichannel A/D converter are primarily stored, the second buffer memory is a data memory of a long bit length to which all data stored in the first buffer memory are transferred by the data update commanding means at a point in time before the multichannel A/D converter completes A/D conversion of all channels and starts next A/D conversion and at a timing excluding the organization timing of the second report packet, and a pair of A/D conversion data among the A/D conversion data of all channels stored in the second buffer memory are respectively divided into high-order and low-order bits and organized and stored in 3 frames in the second report packet.

7. The on-vehicle electronic control device of claim 1, wherein the second control circuit unit further includes periodic A/D conversion commanding means, and the periodic A/D conversion commanding means is means that supplies an A/D conversion command with respect to the multichannel A/D converter periodically at time intervals shorter than the shortest period of the periodic reporting.

8. The on-vehicle electronic control device of claim 2, wherein the first control circuit unit further includes periodic report allowing means, the second control circuit unit further includes A/D conversion period designating means, the periodic report allowing means is means that is transmitted by the periodic transmitting means to a data memory of a predetermined address disposed in the second control circuit unit and stores command data for allowing the second control circuit unit to transmit the periodic report, and the A/D conversion period designating means are means that designate an A/D conversion start period in a relationship where the series of A/D conversion operations by the multichannel A/D converter are completed until a period in which the second control circuit unit generates an A/D conversion start command of plural times with respect to the multichannel A/D converter and transmits the next second report packet immediately after the second control circuit unit has transmitted the first report packet or after a predetermined amount of time after transmitting the first report packet after receiving the periodic report allowance command transmitted from the first control circuit unit.

9. The on-vehicle electronic control device of claim 8, wherein the first control circuit unit further includes non-periodic transmitting means and A/D conversion allowing means, the second control circuit unit further includes report replying means, the non-periodic transmitting means is means that is summarized as needed in order for the first control circuit unit to read and confirm monitor input data of a designated address with respect to the second control circuit unit and to read and check write save data that have been written and set by the periodic transmitting means, the report replying means is means that performs report reply by a report reply packet that has organized the monitor input data of the designated address or the write save data as a confirmation reply with respect to the fact that the second control circuit unit has received the non-periodic transmission data, and the A/D conversion allowing means is means that is transmitted by the periodic transmission packet to a data memory of a predetermined address disposed in the second control circuit unit and stores command data for allowing the second control circuit unit to generate an A/D conversion start command with respect to the multichannel A/D converter, so that A/D conversion by the multichannel A/D converter is periodically executed even in a state where periodic reporting is not being allowed by the periodic report allowing means and report reply of the A/D conversion data corresponding to the non-periodic transmitting means can be performed.

10. The on-vehicle electronic control device of claim 1, wherein the second control circuit unit further includes an auxiliary CPU with which an auxiliary program memory and an auxiliary RAM memory for arithmetic processing serving as the data memory cooperate, the auxiliary CPU configures the communication control circuit unit and is internally housed in the second control circuit unit together with the indirect switch signal input circuit, the indirect analog signal input circuit including the multichannel A/D converter, an indirect output signal-use interface circuit, and the second serial/parallel converter, and the auxiliary CPU is a microprocessor that transmits, to the first control circuit unit via the first and second serial/parallel converters, indirect input signals associated with signals inputted via the indirect switch signal input circuit and the indirect analog signal input circuit and drives an electric load group connected to the indirect output signal-use interface circuit by an output associated with indirect output signals received from the first control circuit unit via the first and second serial/parallel converters.

11. The on-vehicle electronic control device of claim 10, wherein the auxiliary RAM memory includes the data memory and first and second buffer memories, the multichannel A/D converter includes an accompanying buffer memory that stores the A/D conversion data of all channels, and the contents of the accompanying buffer memory are transferred to the first buffer memory in accompaniment with the completion of A/D conversion of all channels.

\* \* \* \* \*